(12) United States Patent
Nakaoka

(10) Patent No.: US 9,055,258 B2
(45) Date of Patent: Jun. 9, 2015

(54) VIDEO DISPLAY APPARATUS AND VIDEO DISPLAY METHOD

(75) Inventor: Katsunori Nakaoka, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 14/113,202

(22) PCT Filed: Mar. 28, 2012

(86) PCT No.: PCT/JP2012/002157
§ 371 (c)(1),
(2), (4) Date: Oct. 21, 2013

(87) PCT Pub. No.: WO2012/147276
PCT Pub. Date: Nov. 1, 2012

(65) Prior Publication Data
US 2014/0043534 A1    Feb. 13, 2014

(30) Foreign Application Priority Data

Apr. 28, 2011 (JP) ................................ 2011-102169

(51) Int. Cl.
*H04N 5/445* (2011.01)
*H04N 13/00* (2006.01)
(Continued)

(52) U.S. Cl.
CPC ............ *H04N 5/445* (2013.01); *H04N 13/007* (2013.01); *H04N 13/0456* (2013.01); *H04N 13/0497* (2013.01); *H04N 21/4312* (2013.01); *H04N 21/4438* (2013.01); *H04N 21/4858* (2013.01);
(Continued)

(58) Field of Classification Search
USPC ......... 348/563, 564–565, 569, 468, 589, 600, 348/634, 731, 598; 345/419, 629, 660, 788, 345/800, 801, 792; 725/41, 46, 38–39, 40, 725/43, 44, 45, 47, 52, 56

See application file for complete search history.

(56) References Cited

U.S. PATENT DOCUMENTS 5,898,433 A    4/1999 Hijikata
6,023,277 A    2/2000 Osaka et al.
(Continued)

FOREIGN PATENT DOCUMENTS

CN    1147782 C    4/2004
CN    1174310 C    11/2004
(Continued)

OTHER PUBLICATIONS

International Search Report issued in PCT/JP2012/002157, dated May 22, 2012.
(Continued)

*Primary Examiner* — Trang U Tran
(74) *Attorney, Agent, or Firm* — McDermott Will & Emery LLP

(57) ABSTRACT

A video display apparatus includes: a receiving unit which receives plural videos; a display unit; and a control unit which controls display of the display unit such that the plural videos appear on the display unit in a multi-window format for displaying the plural videos, wherein for each of the plural windows, the control unit determines a window projecting amount indicating an amount of projection of the window, and controls the display such that a video to be displayed in the window appears to be projecting or receding, due to parallax, by an amount obtained by adding the window projecting amount to a video projecting amount indicating an amount of projection of the video.

65 Claims, 22 Drawing Sheets

(51) Int. Cl.
  *H04N 13/04* (2006.01)
  *H04N 21/431* (2011.01)
  *H04N 21/443* (2011.01)
  *H04N 21/485* (2011.01)
  *H04N 21/488* (2011.01)
  *G09G 3/00* (2006.01)
  *G09G 5/14* (2006.01)

(52) U.S. Cl.
  CPC ........... *H04N 21/4884* (2013.01); *G09G 3/003* (2013.01); *G09G 5/14* (2013.01)

(56) References Cited

U.S. PATENT DOCUMENTS

| | | | |
|---|---|---|---|
| 6,344,863 | B1 | 2/2002 | Capelli et al. |
| 6,542,168 | B2 | 4/2003 | Negishi et al. |
| 6,885,406 | B2 * | 4/2005 | Yui et al. ................. 348/564 |
| 7,456,836 | B2 | 11/2008 | Mamiya et al. |
| 8,261,304 | B2 * | 9/2012 | Bae et al. ................. 725/46 |
| 8,458,147 | B2 | 6/2013 | Payne et al. |
| 2001/0002124 | A1 | 5/2001 | Mamiya et al. |
| 2002/0080182 | A1 | 6/2002 | Negishi et al. |
| 2007/0171229 | A1 | 7/2007 | Mamiya et al. |
| 2009/0244258 | A1 | 10/2009 | Masuda et al. |
| 2009/0278916 | A1 | 11/2009 | Ito |
| 2010/0049719 | A1 | 2/2010 | Payne et al. |
| 2011/0138278 | A1 | 6/2011 | Miyata |
| 2011/0310099 | A1 | 12/2011 | Yamana et al. |

FOREIGN PATENT DOCUMENTS

| | | |
|---|---|---|
| CN | 1182469 C | 12/2004 |
| CN | 101375238 A | 2/2009 |
| JP | 10-074267 A | 3/1998 |
| JP | 10-320167 A | 12/1998 |
| JP | 2976879 B2 | 9/1999 |
| JP | 2001-325054 A | 11/2001 |
| JP | 2004-355290 A | 12/2004 |
| JP | 2009-246625 A | 3/2009 |
| JP | 2009-265258 A | 11/2009 |
| JP | 4656385 B2 | 3/2011 |
| JP | 2011-070450 A | 4/2011 |
| WO | 2004-099965 A1 | 11/2004 |
| WO | 2010-021834 A2 | 2/2010 |
| WO | 2010-050382 A1 | 5/2010 |

OTHER PUBLICATIONS

Chinese Office Action and Search Report issued in Chinese Application No. 2012800199546, dated Feb. 11, 2015, with English translation of Search Report.

* cited by examiner

FIG. 24
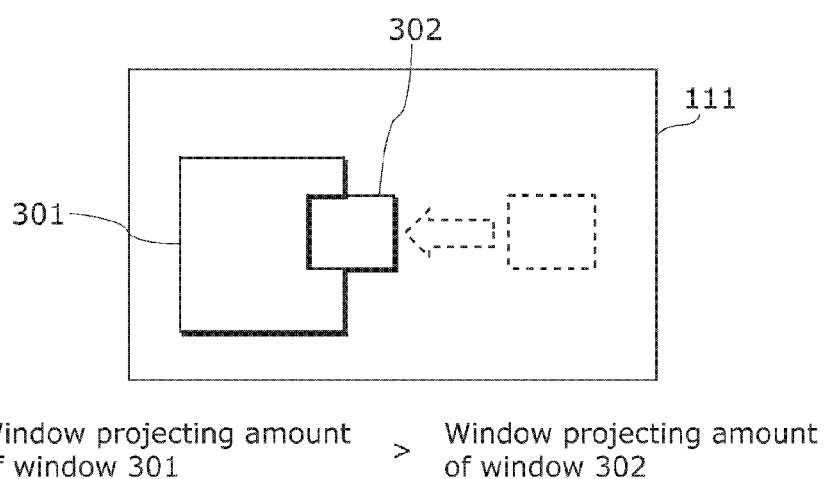
Window projecting amount of window 301 > Window projecting amount of window 302
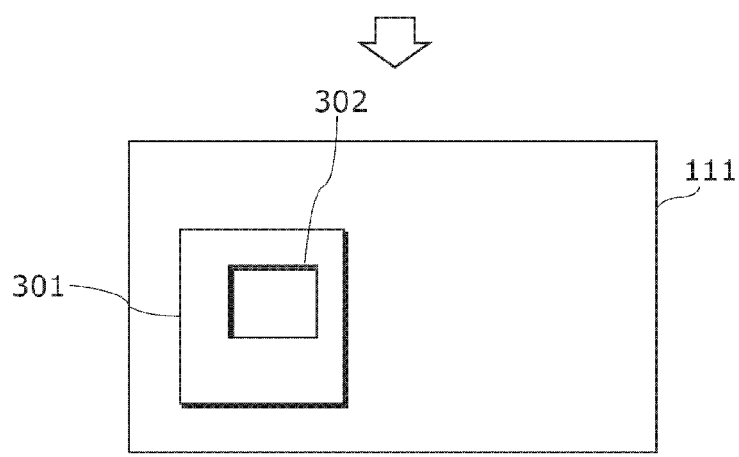

VIDEO DISPLAY APPARATUS AND VIDEO DISPLAY METHOD

RELATED APPLICATIONS

This application is the U.S. National Phase under 35 U.S.C. §371 of International Application No. PCT/JP2012/002157, filed on Mar. 28, 2012, which in turn claims the benefit of Japanese Application No. 2011-102169, filed on Apr. 28, 2011, the disclosures of which applications are incorporated by reference herein.

TECHNICAL FIELD

The present invention relates to video display apparatuses and video display methods for displaying plural videos.

BACKGROUND ART

In recent years, various videos are provided due to an increase in the number of channels for television broadcasting and wide spread of the Internet. Various video display apparatuses have also been provided following this. In particular, television receivers called smart televisions are now on the market.

Typical smart televisions have the Internet connection function. This allows such smart televisions to receive videos not only through television broadcasting, but also via the Internet. Various videos are provided on the Internet. The smart televisions can receive such videos, and display the received videos. Furthermore, smart televisions can download application programs such as games, and can execute the downloaded application programs.

A smart television is basically manipulated via a touch screen. In other words, such a smart television includes a highly advanced user interface. For example, a smart television obtains various instructions from a user via a graphical user interface (GUI), and executes the obtained instructions. This allows the user to have his/her smart television to execute complicated instructions which are difficult to be carried out by conventional operation using a remote control.

Widely used recent video display apparatuses of various types include a video display apparatus which displays videos in three dimensions (3D) by using parallax. For example, Patent Literature (PTL) 1 discloses a stereoscopic display apparatus which displays a stereoscopic image which can be stereoscopically viewed.

The stereoscopic display apparatus disclosed in PTL 1 displays, as a stereoscopic image, only an image selected from among plural images, and displays other images as plane images. Alternatively, the stereoscopic display apparatus according to PTL 1 displays, as a plane image, only an image selected from among plural images, and displays other images as stereoscopic images. In other words, the stereoscopic display apparatus according to PTL 1 converts only a selected image to provide the image with a stereoscopic effect. This allows the stereoscopic display apparatus to make the selected image conspicuous, and improve the visibility of the selected image.

CITATION LIST

[Patent Literature]
[PTL 1] Japanese Unexamined Patent Application Publication No. 2009-246625

SUMMARY OF INVENTION

Technical Problem

However, the stereoscopic display apparatus disclosed in PTL 1 makes only the selected image conspicuous. Specifically, the stereoscopic display apparatus according to PTL 1 merely converts the selected image uniformly to give the image a stereoscopic effect, which lacks a wide variety of expression forms. As described above, various videos have been provided in recent years, and thus there is a demand for the display of such various videos in a wider variety of expression forms.

Furthermore, there is a demand for video display apparatuses such as smart televisions with which various operations are possible to perform not only uniform display based on uniform operation, but also flexible display based on flexible operation.

In view of this, an object of the present invention is to provide a video display apparatus which can display videos in a wider variety of expression forms.

Solution to Problem

In order to solve the above problems, a video display apparatus according to an aspect of the present invention includes a receiving unit configured to receive plural videos; a display unit; and a control unit configured to control display of the display unit such that the plural videos are displayed on the display unit in a multi-window format in which plural windows are used for displaying the plural videos, wherein for each of the plural windows, the control unit is configured to determine a window projecting amount indicating an amount of projection of the window, and control the display such that one of the videos to be displayed in the window appears to be projecting or receding, due to parallax, by an amount obtained by adding the window projecting amount to a video projecting amount indicating an amount of projection of the video.

Consequently, the amount of projection of each of the plural windows is determined. The plural videos are then displayed in the plural windows having various amounts of projection. Consequently, the plural videos are displayed in a wider variety of expression forms.

The control unit may be configured to control the display such that in an area in which two or more of the plural windows overlap, one of the videos is displayed which is to appear in one of the two or more overlapping windows that has the largest window projecting amount.

This allows the front/back relationship of the windows to be in correspondence with the window projecting amounts. Consequently, the visibility of the front/back relationship of the windows improves.

For each of the plural windows, the control unit may be configured to determine whether to display, in three dimensions (3D), one of the videos to appear in the window, and control the display such that the video is displayed in 3D using parallax, when the control unit determines that the video is to be displayed in 3D.

In this manner, the plural videos are each displayed in 2D or 3D in a window. Consequently, the plural videos are displayed in a wider variety of expression forms.

The control unit may be configured to determine an appearance in the multi-window format, according to attributes of the plural videos, and control the display such that the plural videos are displayed in the appearance.

In this manner, the appearance in the multi-window format is determined according to the attributes of the plural videos. Consequently, the plural videos are adaptively displayed according to the attributes thereof.

For each of the plural videos, the control unit may be configured to determine the window projecting amount for the video, according to the attribute of the video, and control the display such that the video appears to be projecting or receding by an amount obtained by adding the window projecting amount to the video projecting amount of the video.

In this manner, the window projecting amounts are determined according to the attributes of the videos. Consequently, the amounts of projection are adjusted according to the attributes of the videos.

For each of the plural videos, the control unit may be configured to determine whether to display the video in 3D, according to the attribute of the video, and control the display such that the video is displayed in 3D using parallax, when the control unit determines that the video is to be displayed in 3D.

This allows the plural videos to be each displayed in 2D or 3D according to the attribute of the video. Consequently, the plural videos are displayed in a wider variety of expression forms.

For each of the plural videos, the control unit may be configured to determine whether to display the video as a motion video, according to the attribute of the video, and control the display such that the video is displayed as a motion video, when the control unit determines that the video is to be displayed as a motion video.

This allows the plural videos to be each displayed as a motion video or a still image according to the attribute of the video. Consequently, the plural videos are displayed in a wider variety of expression forms.

The control unit may be configured to determine the appearance according to categories to which the plural videos belong, and control the display such that the plural videos are displayed in the appearance.

This allows the appearance in the multi-window format to be determined according to the categories of the plural videos. Consequently, the plural videos are each displayed adaptively according to the category thereof.

For each of the plural videos, the control unit may be configured to determine the window projecting amount for the video, according to one of the categories to which the video belongs, and control the display such that the video appears to be projecting or receding by an amount obtained by adding the window projecting amount to the video projecting amount of the video.

In this manner, the plural videos each appear to be projecting or receding by the amount of projection based on the category of the video.

For each of the plural videos, the control unit may be configured to determine whether to display the video in 3D, according to one of the categories to which the video belongs, and control the display such that the video is displayed in 3D using parallax, when the control unit determines that the video is to be displayed in 3D.

This allows the plural videos to be each displayed in 2D or 3D, according to the category of the video. Consequently, the plural videos are displayed in a wider variety of expression forms.

For each of the plural videos, the control unit may be configured to determine placement of one of the windows in which the video is to be displayed, according to one of the categories to which the video belongs, and control the display such that the video is displayed in an area where the window is placed.

In this manner, the placement of the windows is determined according to the categories of the videos. Consequently, the plural videos are displayed based on the categories. Thus, visibility improves.

The control unit may be configured to control the display such that, for each of the categories, one of the plural videos that has the largest video projecting amount is displayed in 3D.

This allows a video having the largest video projecting amount to be displayed in 3D for each category. Consequently, the video display apparatus can display a 3D video effectively, while reducing the load.

The video display apparatus may further include a user interface unit configured to obtain an instruction from a user, wherein the user interface unit may be configured to obtain, as the instruction, at least one of (i) a setting for each of the categories as to whether to display one or more of the videos belonging to the category in 3D and (ii) a setting of, for each of the categories, the window projecting amount for one or more of the videos belonging to the category, and the control unit may be configured to determine the appearance, based on the setting, and control the display such that the plural videos are displayed in the appearance.

This allows the appearance in the multi-window format to be adaptively determined based on user instructions for the categories.

For each of the plural videos, the control unit may be configured to determine the window projecting amount for the video, according to sound included in the video, and control the display such that the video appears to be projecting or receding by an amount obtained by adding the window projecting amount to the video projecting amount of the video.

Thus, the plural windows each appear to be projecting or receding by the amount of projection based on sound of the video.

When a sound volume of a first video among the plural videos is higher than a sound volume of a second video included in the plural videos and different from the first video, the control unit may be configured to determine a first window projecting amount for the first video to be larger than a second window projecting amount for the second video, and control the display such that the first video appears to be projecting or receding by an amount obtained by adding the first window projecting amount to the video projecting amount of the first video.

In this manner, a video whose sound volume is high appears to be more projecting than other videos. This allows such a video to provide more powerful effects.

The control unit may be configured to determine the appearance, according to the video projecting amounts of the plural videos, and control the display such that the plural videos are displayed in the appearance.

This allows the appearance in the multi-window format to be determined based on the video projecting amounts. Thus, the plural videos are displayed in an appropriate appearance in the multi-window format, based on the video projecting amounts thereof.

For each of the plural videos, the control unit may be configured to determine the window projecting amount for the video, according to the video projecting amount of the video, and control the display such that the video appears to be projecting or receding by an amount obtained by adding the window projecting amount to the video projecting amount of the video.

This allows the window projecting amounts to be determined according to the video projecting amounts. Consequently, the amounts of projection are adjusted according to the video projecting amounts.

When a first video projecting amount of a first video among the plural videos is larger than a second video projecting amount of a second video included in the plural videos and different from the first video, the control unit may be configured to determine a first window projecting amount for the first video to be larger than a second window projecting amount for the second video, and control the display such that the first video appears to be projecting or receding by an amount obtained by adding the first window projecting amount to the first video projecting amount.

In this manner, a video having a larger video projecting amount appears to be projecting more than other videos. This allows such a video to provide more powerful effects.

For each of the plural videos, the control unit may be configured to determine whether to display the video in 3D, according to the video projecting amount of the video, and control the display such that the video is displayed in 3D using parallax, when the control unit determines that the video is to be displayed in 3D.

This allows the plural videos to be each displayed in 2D or 3D according to the video projecting amount of the video. Consequently, the plural videos are displayed in a wider variety of expression forms.

The control unit may be configured to control the display such that only a video among the plural videos which has the largest video projecting amount is displayed in 3D.

This reduces load on the video display apparatus, and furthermore allows a video which provides powerful effects to be displayed in 3D.

For each of the plural videos, the control unit may be configured to determine whether to display the video as a motion video, according to whether the video is a 3D video, and control the display such that the video is displayed as a motion video, when the control unit determines that the video is to be displayed as a motion video.

This allows the plural videos to be each displayed as a motion video or a still image, according to whether the video is a 2D or 3D video. Consequently, the plural videos are displayed in a wider variety of expression forms.

The control unit may be configured to determine the appearance, according to a determination made for each of the plural videos as to whether the video is a motion video, and control the display such that the plural videos are displayed in the appearance.

This allows the appearance in the multi-window format to be adaptively determined based on whether the videos are motion videos.

For each of the plural videos, the control unit may be configured to determine whether to display the video in 3D, according to whether the video is a motion video, and control the display such that the video is displayed in 3D using parallax, when the control unit determines that the video is to be displayed in 3D.

This allows the plural videos to be each displayed in 2D or 3D, according to whether the video is a motion video or a still image. Consequently, the plural videos are displayed in a wider variety of expression forms.

At a time when all the plural windows are refreshed, the control unit may be configured to, for each of the plural videos, determine the window projecting amount for the video, and control the display such that the video appears to be projecting or receding by an amount obtained by adding the window projecting amount to the video projecting amount of the video.

This allows the display to be adjusted at a time when the windows are refreshed. Thus, the display is adjusted at an appropriate time.

At the time when an entirety of the display is changed in accordance with an instruction from a user, the control unit may be configured to, for each of the plural videos, determine the window projecting amount for the video, and control the display such that the video appears to be projecting or receding by an amount obtained by adding the window projecting amount to the video projecting amount of the video.

This allows the display to be adjusted at a time when the display is changed in accordance with the user instruction. Thus, the plural videos are appropriately displayed in the initial display.

At the time based on a fixed cycle, the control unit may be configured to, for each of the plural videos, determine the window projecting amount for the video, and control the display such that the video appears to be projecting or receding by an amount obtained by adding the window projecting amount to the video projecting amount of the video.

This allows the display to be adjusted in a fixed cycle. Thus, the plural videos are appropriately adjusted and displayed at predetermined intervals.

The receiving unit may be configured to receive a specific video, and the control unit may be configured to identify a subject included in the specific video, determine the appearance in the multi-window format, according to the identified subject, and control the display such that the plural videos are displayed in the appearance.

This allows the appearance in the multi-window format to be adaptively determined based on a subject in a specific video.

The control unit may be configured to identify whether the subject included in the specific video is a specific person, determine the appearance, according to whether the subject is the specific person, and control the display such that the plural videos are displayed in the appearance.

This allows the appearance in the multi-window format to be adaptively determined based on a subject in a specific video.

The video display apparatus may further include a user interface unit configured to obtain an instruction from a user, wherein the control unit may be configured to determine the appearance in the multi-window format in accordance with the instruction, and control the display such that the plural videos are displayed in the appearance.

This allows the appearance in the multi-window format to be adaptively determined based on the user instruction.

The user interface unit may be configured to obtain the instruction to change placement of one of the plural windows, and the control unit may be configured to determine the placement of the window in accordance with the instruction, and control the display such that one of the videos to appear in the window is displayed in an area in which the window is placed.

In this manner, the placement of a window is changed to be at an appropriate position and to have an appropriate size, based on the user instruction.

The user interface unit may be configured to obtain the instruction to change placement of a first window among the plural windows by moving the first window, and when the first window and a second window included in the plural windows and different from the first window overlap due to the change of the placement of the first window in accordance with the instruction, the control unit may be configured to determine the appearance according to a first window projecting amount of the first window and a second window projecting amount of the second window, and control the display such that the plural videos are displayed in the appearance.

This allows, in response to the user instruction, the appearance in the multi-window format to be adaptively determined based on two window projecting amounts, when two windows overlap.

The control unit may be configured to control the display such that in an area where the first window and the second window overlap, one of the videos is displayed which is to appear in one of the first window and the second window that has a larger window projecting amount.

In this manner, a window having a larger window projecting amount is displayed in front. Thus, the front/back relationship of the windows is in correspondence with the window projecting amounts. Consequently, the visibility of the front/back relationship of the windows improves.

The control unit may be configured to control the display by resizing one of the first window and the second window to prevent a video from being covered, the video being to appear in one of the first window and the second window that has a smaller window projecting amount.

This allows the sizes of the windows to be controlled such that a window having a small window projecting amount is prevented from being covered by a window having a large window projecting amount.

When the first window projecting amount is smaller than the second window projecting amount, the control unit may be configured to control the display such that one of the videos to appear in the first window is displayed in an area where the first window and the second window overlap.

In this manner, a window having a smaller window projecting amount is displayed to prevent the window having a smaller window projecting amount from being covered by a window having a larger window projecting amount.

When the first window projecting amount and the second window projecting amount are equal, the control unit may be configured to control the display to prevent the first window and the second window from being displayed overlapping.

In this manner, two windows having equal window projecting amounts are controlled so as not to overlap. Consequently, inappropriate display is prevented.

When the first window projecting amount and the second window projecting amount are different, the control unit may be configured to control the display such that the first window and the second window are placed at predetermined relative positions.

This allows, if the window projecting amounts of two windows are not equal, the two windows to be displayed at predetermined appropriate positions. Consequently, visibility improves.

When the first window projecting amount and the second window projecting amount are equal, the control unit may be configured to control the display such that the first window and the second window are displayed overlapping.

Consequently, if the window projecting amounts of two windows are equal, the two windows are displayed at the same position.

When the first window projecting amount and the second window projecting amount are equal, the control unit may be configured to control the display such that the first window and the second window are placed at predetermined relative positions.

Consequently, if the window projecting amounts of two windows are equal, the two windows are displayed at predetermined appropriate positions. Thus, visibility improves.

The control unit may be configured to control the display such that a child window is displayed in a parent window in accordance with the instruction, the parent window being one of the plural windows, the child window being one of the plural windows and different from the parent window.

This allows a child window to be displayed in a parent window. Consequently, the plural videos are displayed in a wider variety of expression forms.

The control unit may be configured to determine a child window projecting amount of the child window to be larger than a parent window projecting amount of the parent window, and control the display such that one of the videos to be displayed in the child window appears to be projecting or receding by an amount obtained by adding the child window projecting amount to the video projecting amount of the video.

This causes the window projecting amount of the child window to be larger than the window projecting amount of the parent window. Consequently, the two windows are displayed in an appropriate display format.

The control unit may be configured to determine the placement of the one of the plural windows in accordance with the instruction, determine whether to display, in 3D, the video to appear in the window, according to the placement of the window, and control the display such that the video is displayed in 3D in an area based on the placement of the window, when the control unit determines that the video is to be displayed in 3D.

In this manner, a video to appear in a window is displayed in 2D or 3D, based on the placement of the window. Thus, 2D or 3D is selected based on the placement thereof.

The control unit may be configured to determine to display, in 3D, the video which is to appear in the window, when the window is included in a specific area, and control the display such that the video is displayed in 3D.

Consequently, a video to appear in a window placed in a specific area is displayed in 3D. In other words, the area where a video is displayed in 3D is limited to a specific area. Thus, visibility improves.

The control unit may be configured to determine the placement of the window such that the window is not placed over a boundary of the specific area, and control the display such that the video is displayed in an area based on the placement of the window.

This prevents a window from being placed in a confusing area. Consequently, whether to display a video in 3D is more clearly distinguished.

The control unit may be configured to determine the placement of the window in accordance with the instruction, determine the window projecting amount of the window, according to the placement of the window, and control the display such that the video to be displayed in the window appears to be projecting or receding by an amount obtained by adding the window projecting amount to the video projecting amount of the video.

This allows placement of a window to be determined, based on the window projecting amount. Thus, the window projecting amount is selected based on the placement.

The user interface unit may be configured to obtain, as the instruction, a setting of the window projecting amount of one of the plural windows which is limited to a range where the window projecting amount is settable, the range being predetermined according to an area in which the window is placed, and the control unit may be configured to control the display such that one of the videos to be displayed in the window appears to be projecting or receding in the area based on the placement of the window, by an amount obtained by adding the window projecting amount based on the setting to the video projecting amount of the video.

In this manner, the window projecting amount and others are set in a predetermined range where the amount can be set. As a result, the appearance is determined appropriately, based on the setting.

The user interface unit may be configured to obtain the instruction to remove a predetermined one of the windows, and the control unit may be configured to remove the predetermined window in accordance with the instruction, and control the display such that the window projecting amount of a window behind the predetermined window is larger than the window projecting amount of the window prior to the removal of the predetermined window.

In this manner, after a front window is removed, a window behind appears to be projecting more than prior to the removal of the front window. This adjusts a stereoscopic effect appropriately.

The user interface unit may be configured to obtain the instruction to remove a predetermined one of the windows, and the control unit may be configured to remove the predetermined window in accordance with the instruction, and control the display such that the window projecting amount of a window in front of the predetermined window is smaller than the window projecting amount of the window prior to the removal of the predetermined window.

In this manner, after a window behind is removed, a front window appears to be receding more than prior to the removal of the window behind. This adjusts a stereoscopic effect appropriately.

The control unit may be configured to control the display by removing the predetermined window at a time when an event is generated for the predetermined window in response to the instruction.

In this manner, a window is removed according to an event. The display of other windows is controlled appropriately according to the removal of the window.

The user interface unit may be configured to obtain the instruction to transfer information in relation to a first window in foreground among the plural windows to another device different from the video display apparatus, and the control unit may be configured to remove the first window in response to the instruction, and control the display such that the window projecting amount of a second window behind the first window is larger than the window projecting amount of the second window prior to the removal of the first window.

In this manner, a window is removed according to the transfer to another apparatus. The display of other windows is controlled appropriately according to the removal of the window.

The control unit may be configured to determine an appearance in the multi-window format, according to a load on the video display apparatus, and control the display such that the plural videos are displayed in the appearance.

In this manner, the appearance in the multi-window format is determined according to the load. Consequently, plural videos are adaptively displayed according to the load.

The control unit may be configured to calculate the load, based on sizes of the plural windows, a total number of the plural windows, or sizes of the plural videos, determine the appearance according to the load, and control the display such that the plural videos are displayed in the appearance.

This allows the appearance to be determined, according to the load based on the sizes of windows, the number of windows, or the sizes of videos. It is assumed that load varies depending on the sizes of windows and others. Thus, the appearance is determined based on assumed appropriate load.

The control unit may be configured to calculate the load, based on a total number of windows each for displaying a video in 3D among the plural windows, determine the appearance according to the load, and control the display such that the plural videos are displayed in the appearance.

This allows the appearance to be determined according to the load based on the number of windows where 3D videos are displayed. It is assumed that load varies depending on the number of windows where 3D videos are displayed. Thus, the appearance is determined based on assumed appropriate load.

The control unit may be configured to control the display by limiting a total number of the plural windows when the load is greater than a predetermined threshold value.

In this manner, the number of windows is limited if load is large. It is assumed that the number of windows has influence on the load. Thus, load is appropriately reduced by limiting the number of windows.

The control unit may be configured to control the display by limiting sizes of the plural windows when the load is greater than a predetermined threshold value.

In this manner, the sizes of windows are limited if the load is large. It is assumed that the window size has influence on the load. Consequently, the load is appropriately reduced by limiting the window size.

The control unit may be configured to control the display such that, among the plural videos, a motion video is displayed as a still image, when the load is greater than a predetermined threshold value.

In this manner, the display of a motion video is limited if load is large. It is assumed that the display of a motion video has influence on the load. Consequently, the load is appropriately reduced by limiting the display of a motion video.

The control unit may be configured to control the display such that, among the plural videos, a 3D video is displayed in 2D, when the load is greater than a predetermined threshold value.

In this manner, the 3D display is limited if the load is large. It is assumed that 3D display has influence on the load. Consequently, the load is appropriately reduced by limiting the 3D display.

The control unit may be configured to control the display such that error concealment control is executed, when the load is smaller than or equal to a predetermined threshold value.

In this manner, error concealment processing is executed only when the load is small. It is assumed that error concealment processing has influence on the load. Thus, load is appropriately reduced by limiting error concealment processing.

The control unit may be configured to control the display such that, among the plural windows, only a window in foreground is displayed in an appearance different from an appearance for a window different from the window in the foreground.

This allows a window in the foreground to be displayed in a more conspicuous way. Thus, the visibility of the window in the foreground improves.

The control unit may be configured to control the display such that the window in the foreground appears to be larger than the different window.

This allows the window in the foreground to be displayed in a large size. Consequently, the visibility of the window in the foreground improves.

The control unit may be configured to control the display such that only a video to appear in the window in the foreground is displayed in 3D among the plural videos.

This allows a video which is to appear in the window in the foreground to be displayed in 3D. Consequently, the visibility of the window in the foreground improves.

The control unit may be configured to determine the window projecting amounts of the plural windows such that only the window in the foreground has a larger window projecting amount than the window projecting amount of the different window, and control the display such that one of the videos to be displayed in the window in the foreground appears to be projecting or receding by an amount obtained by adding the window projecting amount of the window in the foreground to the video projecting amount of the video.

In this manner, the window projecting amount of the window in the foreground becomes larger than other windows. Consequently, the visibility of the window in the foreground improves.

The control unit may be configured to determine plural subtitles projecting amounts of subtitles which are to be displayed in the plural windows to be equal in the plural windows, and control the display such that the subtitles are displayed according to the equal subtitles projecting amounts, the plural subtitles projecting amounts indicating amounts of projection of the subtitles.

In this manner, subtitles to appear in plural windows are displayed based on the same amount of projection. Consequently, the visibility of subtitles is maintained even when subtitles are displayed in plural windows.

The video display apparatus may further include a user interface unit configured to obtain an instruction from a user, wherein the user interface unit may be configured to obtain a setting of the window projecting amount of one of the plural windows as the instruction, and the control unit may be configured to determine the plural subtitles projecting amounts such that the plural subtitles projecting amounts are equal even when the user interface unit obtains the setting, and control the display such that the subtitles are displayed according to the equal subtitles projecting amounts.

This excludes the window projecting amount from being set for subtitles. Consequently, the visibility of subtitles is maintained.

The control unit may be configured to determine plural subtitles projecting amounts of subtitles which are to be displayed in the plural windows to be in a predetermined range, and control the display such that the subtitles are displayed according to the plural subtitles projecting amounts in the predetermined range, the plural subtitles projecting amounts indicating amounts of projection of the subtitles.

In this manner, the amount of projection of subtitles is maintained in the predetermined range. Consequently, the visibility of subtitles is maintained.

The control unit may be configured to determine the window projecting amounts of the plural windows by adjusting the window projecting amounts to have different values, and control the display such that the plural videos are displayed according to the window projecting amounts.

In this manner, the window projecting amounts are determined to be different for the windows. Consequently, the plural videos are displayed in a wider variety of expression forms.

The control unit may be configured to determine the window projecting amounts to be in a predetermined range, and control the display such that the plural videos are displayed according to the window projecting amounts.

This limits the window projecting amounts to the predetermined range. Consequently, a decrease in visibility due to an excessive amount of projection is prevented.

A video display method according to an aspect of the invention may include: receiving plural videos; and controlling display of a display unit such that the plural videos are displayed on the display unit in a multi-window format in which plural windows are used for displaying the plural videos, wherein in the control, for each of the plural windows, a window projecting amount indicating an amount of projection of the window may be determined, and the display may be controlled such that one of the videos to be displayed in the window appears to be projecting or receding, due to parallax, by an amount obtained by adding the window projecting amount to a video projecting amount indicating an amount of projection of the video.

In this manner, the video display apparatus is achieved as a video display method.

Advantageous Effects of Invention

According to the present invention, the amount of projection is determined for each of plural windows. Consequently, plural videos are displayed in plural windows having various amounts of projection. Thus, the plural videos are displayed in a wider variety of expression forms.

BRIEF DESCRIPTION OF DRAWINGS

FIG. 24 illustrates a fourteenth example of display according to the embodiment.

DESCRIPTION OF EMBODIMENTS

The following describes in detail an embodiment of the present invention, with use of drawings. It should be noted that each embodiment described below shows a preferable example. The numerical values, shapes, materials, constituent elements, the arrangement and connection of the constituent elements, steps, the processing order of the steps, and the like shown in the following embodiment are mere examples, and therefore are not intended to limit the present invention. Thus, among the constituent elements in the following embodiment, constituent elements not recited in any of the independent claims defining the most generic part of the inventive concept of the present invention are described as arbitrary constituent elements.

Figure 1:
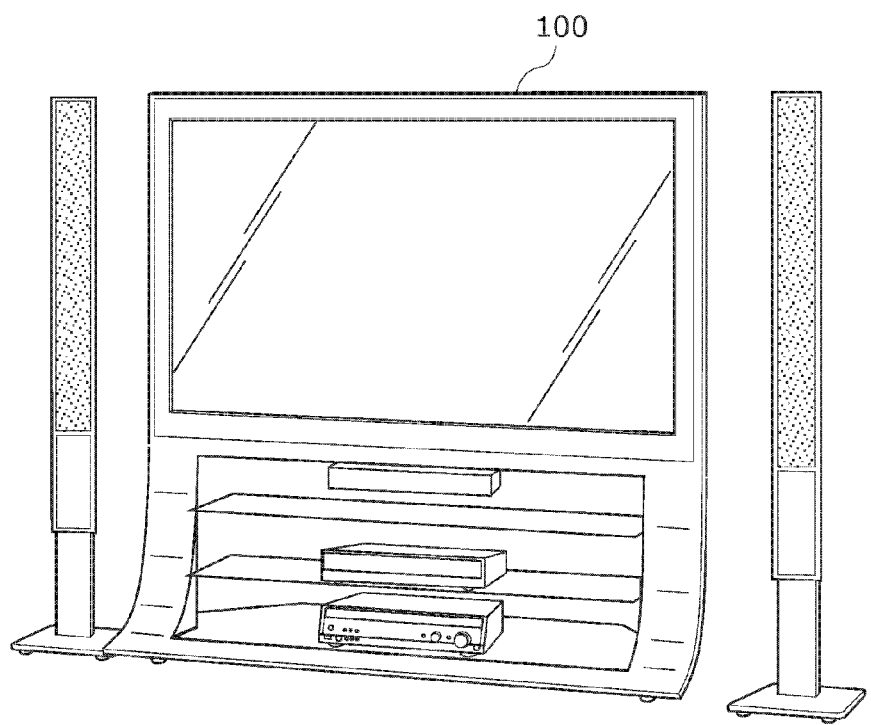
FIG. 1 is an external view of a video display apparatus according to an embodiment.

FIG. 1 is an external view of a video display apparatus according to the present embodiment. As illustrated in FIG. 1, a video display apparatus 100 according to the present embodiment is a typical television receiver. The video display apparatus 100, however, is not limited to such a television receiver, and may be any device which displays videos. For example, the video display apparatus 100 may be a mobile phone or a personal computer.

Figure 2:
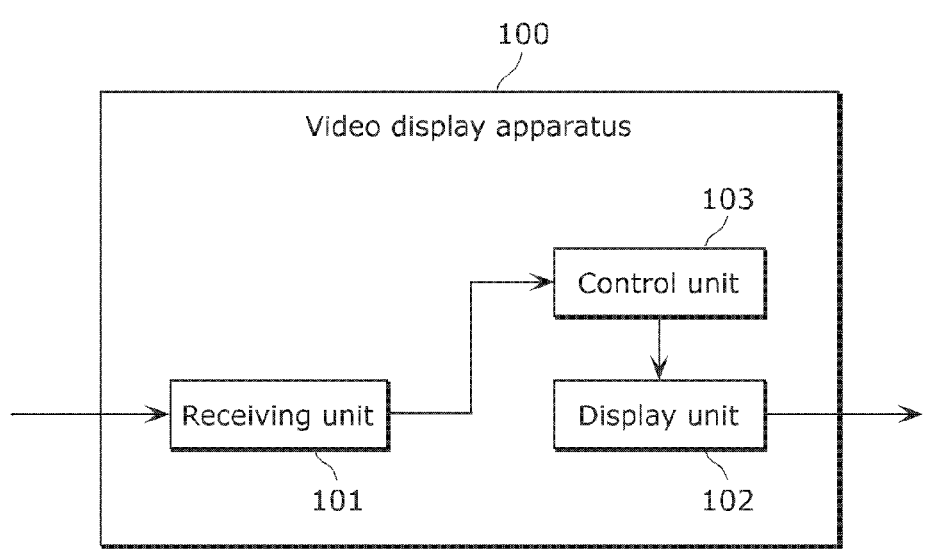
FIG. 2 illustrates a first example of a configuration of the video display apparatus according to the embodiment.

FIG. 2 illustrates a first example of the configuration of the video display apparatus 100 illustrated in FIG. 1. The video display apparatus 100 illustrated in FIG. 2 includes a receiving unit 101, a display unit 102, and a control unit 103.

The receiving unit 101 receives plural videos. The receiving unit 101 may receive plural videos via television broadcasting or the Internet, may receive plural videos from a recording medium, or may receive plural videos in combination of these.

The display unit 102 displays plural videos received by the receiving unit 101. The display unit 102 has a function of displaying videos in 3D using parallax. Specifically, the display unit 102 displays two videos, namely, a left video and a right video, as a stereo video. At that time, the display unit 102 displays the two videos such that a user can see only the left video through the left eye and only the right video through the right eye. There is a disparity between the two videos. In other words, these two videos have difference according to the difference in viewpoint. The user perceives the video in 3D due to parallax.

There are plural methods for presenting a left video to the left eye of a user and a right video to the right eye of a user. For example, a typical method is a method for presenting different videos to the left eye and the right eye with the use of polarized glasses or shutter glasses. Furthermore, there is a method for presenting different videos to the left eye and the right eye, based on the parallax barrier method or the lenticular method, without using glasses. Furthermore, there is a method for directly presenting different videos to the left eye and the right eye using a head mount display.

The methods used for the 3D video display by the display unit 102 may be any of these methods. Furthermore, the display unit 102 may have a screen or project a video on a separate screen.

The control unit 103 displays plural videos received by the receiving unit 101 in a multi-window format on the display unit 102. Here, the multi-window format is an example of the appearance achieved using plural windows. A window means an area for displaying a video.

The control unit 103 determines a window projecting amount for each of plural windows at the time of display. The window projecting amount indicates the amount of projection of a window, or in other words, the magnitude of projection/recession of a window in a projecting direction. The window projecting amount may be represented as an offset value for adjusting a video projecting amount.

The control unit 103 controls the display of the display unit 102 such that a video appears to be projecting due to parallax by an amount obtained by adding the window projecting amount to the video projecting amount. The video projecting amount indicates the amount of projection of a video itself, or in other words, the magnitude of projection/recession of a video itself in the projecting direction. Furthermore, a video projecting amount is previously assigned to data of a video received by the receiving unit 101.

The amounts of projection such as a window projecting amount and a video projecting amount may have negative values. In other words, the amount of projection is an amount of projection having a plus/minus sign (the amount of projection with a sign). For example, if the amount obtained by adding the window projecting amount to the video projecting amount is a negative value, a video appears to be receding in a direction opposite to the projecting direction. In particular, a stereoscopic effect may be lost if the amount of projection is excessively large. Thus, the amount of projection having a negative value may be used.

Here, the amount of projection indicates the magnitude in the projecting direction. However, even if the amount of projection indicates the magnitude in the receding direction opposite to the projecting direction, the essence does not change. The magnitude in the receding direction is also referred to as an amount of depth or an amount of recession. Furthermore, the amount of projection is also referred to as depth or a parallax amount.

Thus, a window projecting amount may be represented as a window depth, a window parallax amount, a window receding amount, or an amount of window depth. Furthermore, a video projecting amount may be represented as a video depth, a video parallax amount, a video receding amount, or an amount of video depth.

It should be noted that in the following, the control unit 103 causing the display unit 102, a screen, or a window to display a video may be expressed as the control unit 103 displaying a video on the display unit 102, on a screen, or in a window.

Figure 3:
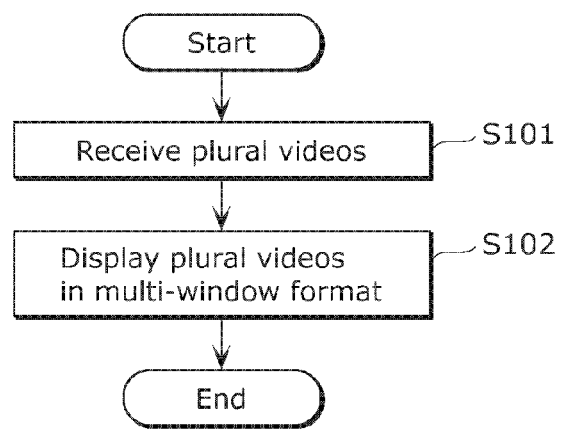
FIG. 3 is a flowchart illustrating a first example of operation of the video display apparatus according to the embodiment.

FIG. 3 is a flowchart illustrating operation of the video display apparatus 100 illustrated in FIG. 2. First, the receiving unit 101 receives plural videos (S101).

Next, the control unit 103 controls display of the display unit 102 such that the plural videos are displayed on the display unit 102 in the multi-window format (S102). At this time, the control unit 103 determines a window projecting amount for each of plural windows. Then, the control unit 103 controls the display such that a video appears to be projecting or receding due to parallax by the amount obtained by adding the window projecting amount to a video projecting amount.

A video appears to be projecting due to parallax if the amount obtained by adding the window projecting amount to the video projecting amount is a positive value, for example. Furthermore, a video appears to be receding due to parallax if the amount obtained by adding the window projecting amount to the video projecting amount is a negative value, for example.

The above determines the amount of projection of each of plural windows. Thus, plural videos are displayed in the plural windows having various amounts of projection. Consequently, the plural videos are displayed in a wider variety of expression forms.

Figure 4:
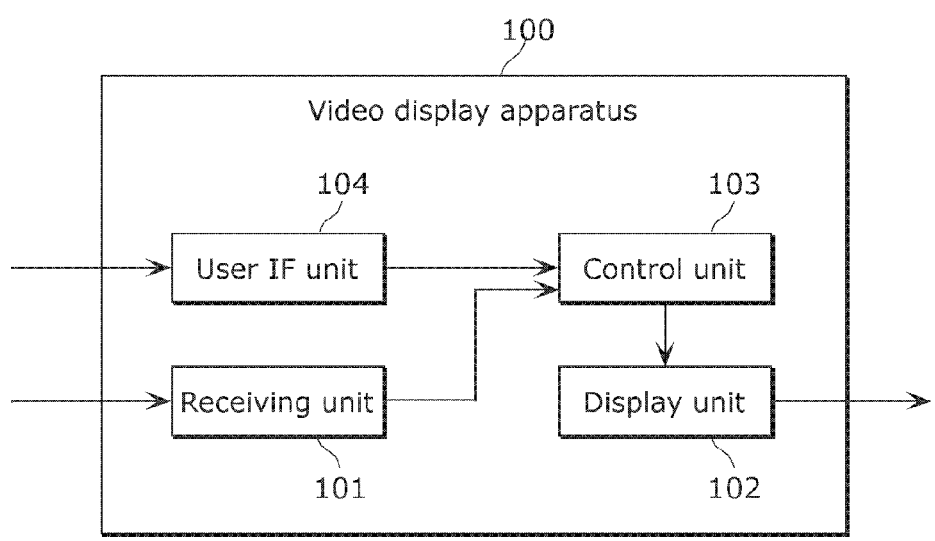
FIG. 4 illustrates a second example of a configuration of the video display apparatus according to the embodiment.

FIG. 4 illustrates a second example of the configuration of the video display apparatus 100 illustrated in FIG. 1. The video display apparatus 100 illustrated in FIG. 4 includes the receiving unit 101, the display unit 102, the control unit 103, and a user interface unit (user IF unit) 104. The video display apparatus 100 illustrated in FIG. 4 additionally includes the user IF unit 104, compared with the video display apparatus 100 illustrated in FIG. 2.

The user IF unit 104 is an interface which obtains user instructions. Typically, the user IF unit 104 receives user instructions via a remote control or a touch screen. Furthermore, the user IF unit 104 may receive user instructions via a communication network or a mobile phone, for instance. Alternatively, an input device such as a remote control may be included in the user IF unit 104.

The user IF unit 104 obtains an instruction to change placement of a window, for example. Here, the placement of a window includes the position and size of the window. More specifically, the user IF unit 104 obtains an instruction move a window or an instruction to resize a window, in response to operation of dragging and dropping the window.

Furthermore, for example, the user IF unit 104 may obtain a setting as to whether to display a video in 3D, as an instruction. The user IF unit 104 may obtain a setting of a window projecting amount, as an instruction. The user IF unit 104 may obtain such a setting for each window or for each video category.

Furthermore, if a window projecting amount is excessively large, the 3D display of a video may not be successfully achieved. In view of this, the user IF unit 104 may obtain a window projecting amount in a predetermined range in which the amount is settable. Further, such an amount settable range may be determined according to an area where a window is placed.

Furthermore, for example, the user IF unit 104 may obtain an instruction to remove one of plural windows. The user IF unit 104 may obtain an instruction to transfer a video to another apparatus. An instruction to transfer a video may include an instruction to remove a window. The user IF unit 104 may obtain an instruction to change the display.

The control unit 103 determines an appearance in the multi-window format, based on attributes of plural videos from the receiving unit 101 or a user instruction from the user IF unit 104. Here, the attribute of a video includes a category, sound, a video projecting amount of the video, for instance. Thereafter, the control unit 103 displays the plural videos on the display unit 102 in the determined appearance. At this time, the control unit 103 may display a video to appear in a window having the largest window projecting amount in an area where two or more windows overlap.

The control unit 103 may determine, for each window, whether to display a video in 3D. If the control unit 103 determines that a video is to be displayed in 3D, the control unit 103 may control the display such that the video is displayed in 3D using parallax. If the control unit 103 determines that a video is not to be displayed in 3D, the control unit 103 may control the display such that the video is displayed in two dimensions (2D).

Here, 3D means a format for displaying a video in 3D using parallax. On the contrary, 2D means a format for displaying a video in 2D. For example, even if a video appears to be projecting according to a window projecting amount, the video is displayed in 2D when a video projecting amount is not set. Such a format is a 2D format. A 3D video is a video to be displayed in 3D, and means a video for which a video projecting amount is set. On the contrary, a 2D video is a video to be displayed in 2D, and means a video for which a video projecting amount is not set.

It may be assumed that a video projecting amount is 0 (zero) if a video projecting amount is not set.

The control unit 103 displays only a left video or a right video on the display unit 102, to display a 3D video in 2D on the display unit 102. Consequently, the 3D video is displayed in 2D.

On the contrary, if a 2D video is to be displayed in 3D on the display unit 102, the control unit 103 displays the 2D video and a video obtained by adding a disparity to the 2D video on the display unit 102. At this time, the control unit 103 can obtain a video to which an appropriate disparity has been added by, for instance, adding a large disparity to an area where edge strength is high, for example. Thereafter, the control unit 103 displays the resultant video on the display unit 102. Consequently, the 2D video is displayed in 3D.

Furthermore, there are plural formats of 3D video signals, such as frame sequential and side by side. The control unit 103 may read 2D video signals at double speed, and generate 3D video signals in accordance with one of such plural formats.

The control unit 103 may determine a window projecting amount according to an attribute of a video. The control unit 103 may determine whether to display a video in 3D, according to the attribute of the video. The control unit 103 may determine whether to display a video as a motion video, according to the attribute of the video.

For example, the control unit 103 may determine a window projecting amount, according to a category of a video. The control unit 103 may determine whether to display a video in 3D, according to a category of the video. The control unit 103 may determine a window projecting amount or whether to display a video in 3D, based on a setting for each category made via the user IF unit 104.

Furthermore, the control unit 103 may determine, for each category of a video, a video having the largest video projecting amount to be displayed in 3D. Furthermore, the control unit 103 may determine placement of a window, according to a category of a video.

The control unit 103 may determine a window projecting amount, according to the sound of a video. At this time, the control unit 103 may determine a window projecting amount such that the window projecting amount of a video having a high sound volume is large.

The control unit 103 may determine the appearance in the multi-window format, according to a video projecting amount of a video. More specifically, the control unit 103 may determine a window projecting amount of a window in which a video is to be displayed, according to a video projecting amount of the video. At this time, the control unit 103 may determine window projecting amounts such that a window projecting amount of a window in which a video is to be displayed is large, the video having a large video projecting amount.

Furthermore, the control unit 103 may determine whether to display a video in 3D, according to a video projecting amount of the video. More specifically, the control unit 103 may determine to display only a video having the largest video projecting amount in 3D.

A video projecting amount of one video may vary due to a temporal difference and a spatial difference. The control unit 103 may determine the appearance in the multi-window format, using the average, the maximum value, or the minimum value of video projecting amounts or a video projecting amount at a predetermined point in time and a predetermined position. Furthermore, the control unit 103 may determine the appearance in the multi-window format, according to a variation in video projecting amount.

Furthermore, the control unit 103 may determine whether to display a video as a motion video, according to whether the video is a 3D video.

The control unit 103 may determine an appearance in the multi-window format, according to whether a video is a motion video. Specifically, the control unit 103 may determine whether to display a video in 3D, according to whether the video is a motion video.

The control unit 103 may determine an appearance in the multi-window format at a time when all windows are refreshed. For example, the control unit 103 may determine an appearance at the time when the entire display is changed. The change of the display may be executed in accordance with a user instruction. For example, the control unit 103 may determine an appearance at a time based on a fixed cycle.

Furthermore, the control unit 103 may determine an appearance in the multi-window format, according to a subject included in a video obtained by the receiving unit 101. For example, the receiving unit 101 obtains a specific video in this case. Then, the control unit 103 identifies the subject included in the specific video, and determines an appearance in the multi-window format, according to the identified subject. More specifically, a subject is a person. The control unit 103 determines an appearance in the multi-window format, according to a person included in a specific video.

The control unit 103 may determine the placement of a window in accordance with a user instruction. If plural windows overlap, the control unit 103 may determine an appearance in the multi-window format, according to the window projecting amounts of the windows.

For example, the control unit 103 may control the display such that a window having a large window projecting amount is displayed in an area where plural windows overlap. In this case, the control unit 103 may control the display to prevent a window having a small window projecting amount from being covered, by resizing a window. The control unit 103 may control the display such that a window having a small window projecting amount is displayed in an area where plural windows overlap.

If the window projecting amounts of plural windows are equal, the control unit 103 may control the display to prevent the plural windows from being displayed overlapping. If two windows having different window projecting amounts overlap, the control unit 103 may control the display such that the two windows are placed at predetermined relative positions.

If the window projecting amounts of plural windows are equal, the control unit 103 may control the display such that the plural windows appear to be overlapping. If two windows having the same window projecting amount overlap, the control unit 103 may control the display such that the two windows are placed at predetermined relative positions.

Furthermore, the control unit 103 may control the display such that a child window is displayed in a parent window in accordance with a user instruction. In this case, the control unit 103 may determine window projecting amounts such that the window projecting amount of the child window is larger than the window projecting amount of the parent window.

In accordance with a user instruction, the control unit 103 may determine the placement of a window, and determine whether to display a video to appear in the window in 3D, based on the placement of the window. In this case, the control unit 103 may determine that the video to appear in the window is to be displayed in 3D if the window is included in a specific area. The control unit 103 may determine the placement of a window to prevent the window from being placed over the boundary of the specific area.

In accordance with a user instruction, the control unit 103 may determine the placement of a window and determine a window projecting amount, based on the placement of the window. The user IF unit 104 may previously obtain and set the amount of projection of a window based on the placement of the window. At this time, the user IF unit 104 may obtain the amount of projection of a window in a range in which the projection amount is settable.

The control unit 103 may remove a window in accordance with a user instruction. Thereafter, the control unit 103 may increase a window projecting amount of a window present behind the removed window. Alternatively, the control unit 103 may decrease a window projecting amount of a window present in front of the removed window.

The control unit 103 may remove a window when an event is generated in accordance with a user instruction. For example, the control unit 103 may remove a window in response to an instruction to transfer information related to the window to another device.

The control unit 103 may determine an appearance in the multi-window format, according to a load. At this time, the control unit 103 may calculate a load, based on the sizes of windows, the number of windows, or the sizes of videos. The size of a video is an input size of the video which is an original size of the video before resized by being assigned to a window. The control unit 103 may calculate a load according to the number of windows for displaying a video in 3D.

The control unit 103 may limit the number of windows or the sizes of windows, if the load is greater than a predetermined threshold value. If the load is greater than the predetermined threshold value, the control unit 103 may control the display such that a motion video is displayed as a still image. If the load is greater than the predetermined threshold value, the control unit 103 may control the display such that a 3D video is displayed in 2D.

The control unit 103 may execute error concealment control, if the load is smaller than or equal to the predetermined threshold value. Error concealment control means control for concealing an error when an error occurs. For example, the control unit 103 conceals an error by displaying only a right video on the display unit 102, if a left video has an error.

Furthermore, the control unit 103 may control the display such that only a window in the foreground is displayed in an appearance different from an appearance for other windows.

For example, the control unit 103 may control the display such that a window in the foreground is larger than other windows. The control unit 103 may control the display such that only a video to appear in a window in the foreground is displayed in 3D. Furthermore, the control unit 103 may determine window projecting amounts of windows such that only the window projecting amount of a window in the foreground is larger than the window projecting amounts of other windows.

The control unit 103 may determine plural subtitles projecting amounts such that the plural subtitles projecting amount of subtitles displayed in plural windows are equal. The control unit 103 may control the display such that subtitles appear to be projecting or receding due to parallax by the same subtitles projecting amount. Here, the subtitles projecting amount indicates the amount of projection of subtitles, namely, the magnitude of projection/recession of subtitles in the projecting direction.

Even if the user IF unit 104 obtains window projecting amounts as instructions, the control unit 103 may determine plural subtitles projecting amounts to be equal. The control unit 103 may determine plural subtitles projecting amounts to be in a predetermined range.

The control unit 103 may determine plural window projecting amounts of plural windows to have different values. The control unit 103 may determine plural window projecting amounts to be in a predetermined range.

It should be noted that the user IF unit 104 may obtain only some of the plural instructions described above or obtain a combination of the plural instructions. The control unit 103 may execute only some of plural controls described above, and execute a combination of the plural controls.

Figure 5:
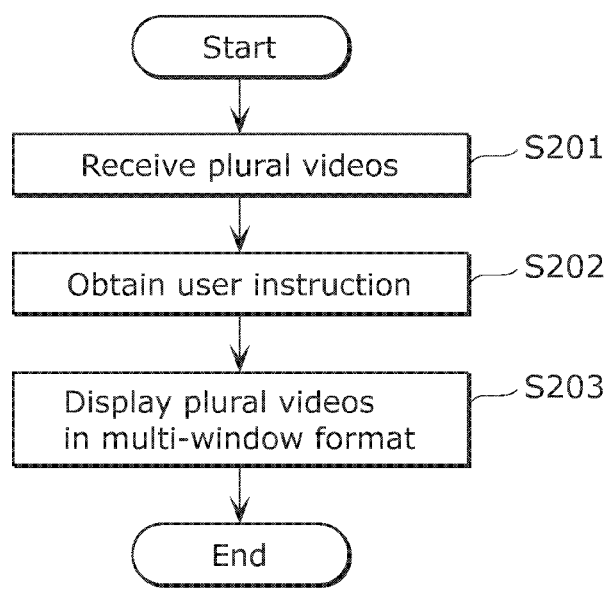
FIG. 5 is a flowchart illustrating a second example of operation of the video display apparatus according to the embodiment.

FIG. 5 is a flowchart illustrating operation of the video display apparatus 100 illustrated in FIG. 4. First, the receiving unit 101 receives plural videos (S201). The user IF unit 104 obtains a user instruction (S202). Thereafter, the control unit 103 controls the display of the display unit 102 such that the plural videos are displayed on the display unit 102 in the multi-window format (S203).

It should be noted that the operation of the receiving unit 101 receiving plural videos (S201) and operation of the user IF unit 104 obtaining a user instruction (S202) may be performed in reverse order.

Accordingly, the appearance in the multi-window format is appropriately determined based on the attributes of videos or user instructions. Thus, plural videos are displayed in a wider variety of expression forms.

Figure 6:
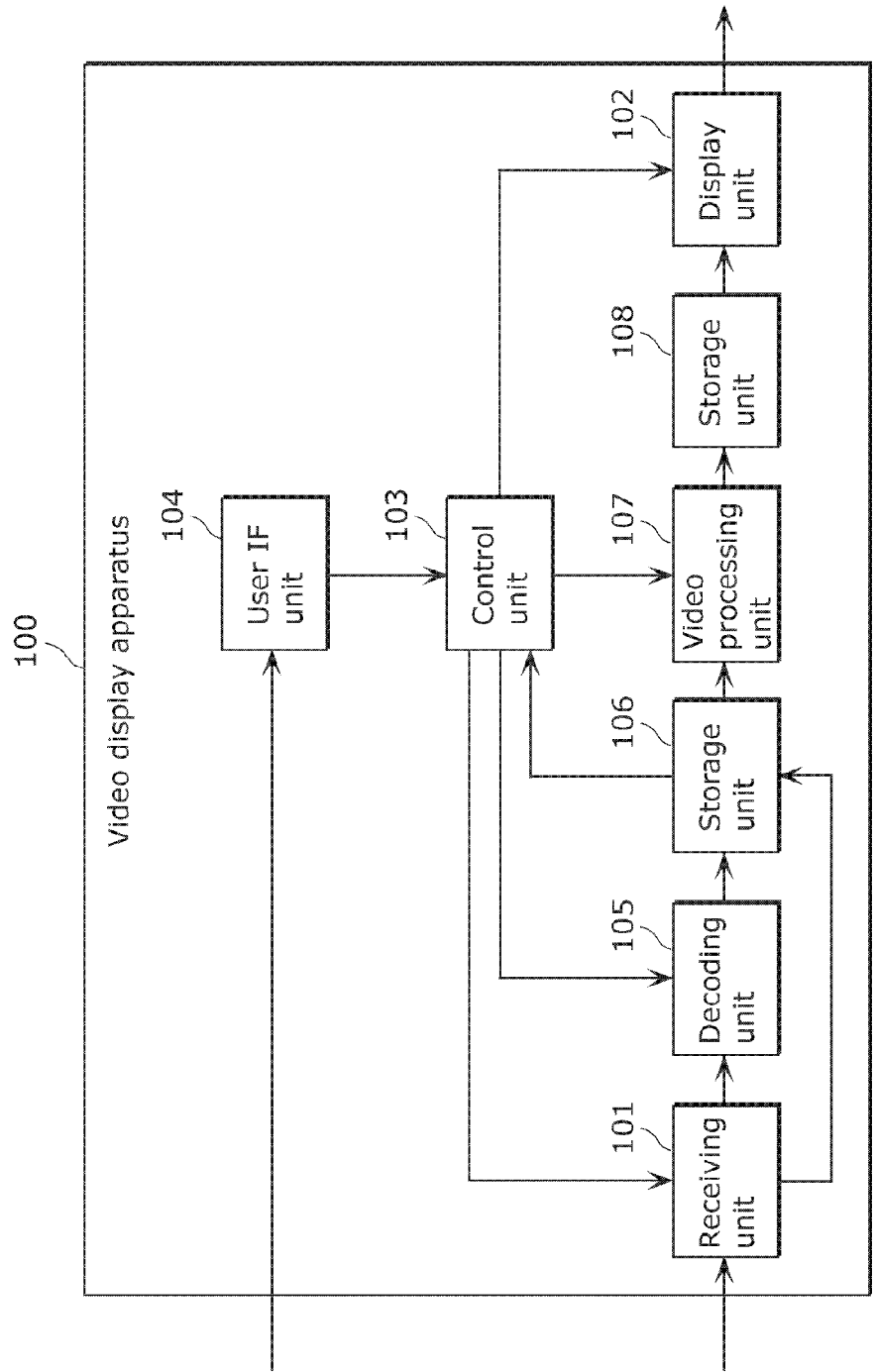
FIG. 6 illustrates a third example of a configuration of the video display apparatus according to the embodiment.

FIG. 6 illustrates a third example of the configuration of the video display apparatus 100 illustrated in FIG. 1. The video display apparatus 100 illustrated in FIG. 6 includes the receiving unit 101, the display unit 102, the control unit 103, the user IF unit 104, a decoding unit 105, a video processing unit 107, and two storage units 106 and 108. Compared with the video display apparatus 100 illustrated in FIG. 4, the video display apparatus 100 illustrated in FIG. 6 additionally includes the decoding unit 105, the video processing unit 107, and the two storage units 106 and 108.

The decoding unit 105 decodes a coded video received by the receiving unit 101. Thereafter, the decoding unit 105 stores the decoded video into the storage unit 106. The receiving unit 101 may store the received video into the storage unit 106, not via the decoding unit 105.

The storage unit 106 is a unit for storing videos received by the receiving unit 101 and/or videos decoded by the decoding unit 105, and typically is a memory. For example, the storage unit 106 may be a volatile memory or a nonvolatile memory.

The video processing unit 107 reads plural videos from the storage unit 106. Thereafter, the video processing unit 107 executes video signal processing, to generate a multi-window video for displaying the plural videos in the multi-window format. After that, the video processing unit 107 stores the multi-window video into the storage unit 108.

The storage unit 108 is a unit for storing a multi-window video generated by the video processing unit 107, and is typically a memory. For example, the storage unit 108 may be a volatile memory or a nonvolatile memory.

The display unit 102 reads a multi-window video from the storage unit 108. Thereafter, the display unit 102 displays the read multi-window video.

The control unit 103 controls overall operation of the video display apparatus 100. The control unit 103 determines a multi-window layout, based on signals obtained from the units. The control unit 103 associates plural windows with plural videos obtained by the receiving unit 101. The control unit 103 displays a multi-window video in 3D on the display unit 102.

Figure 7:
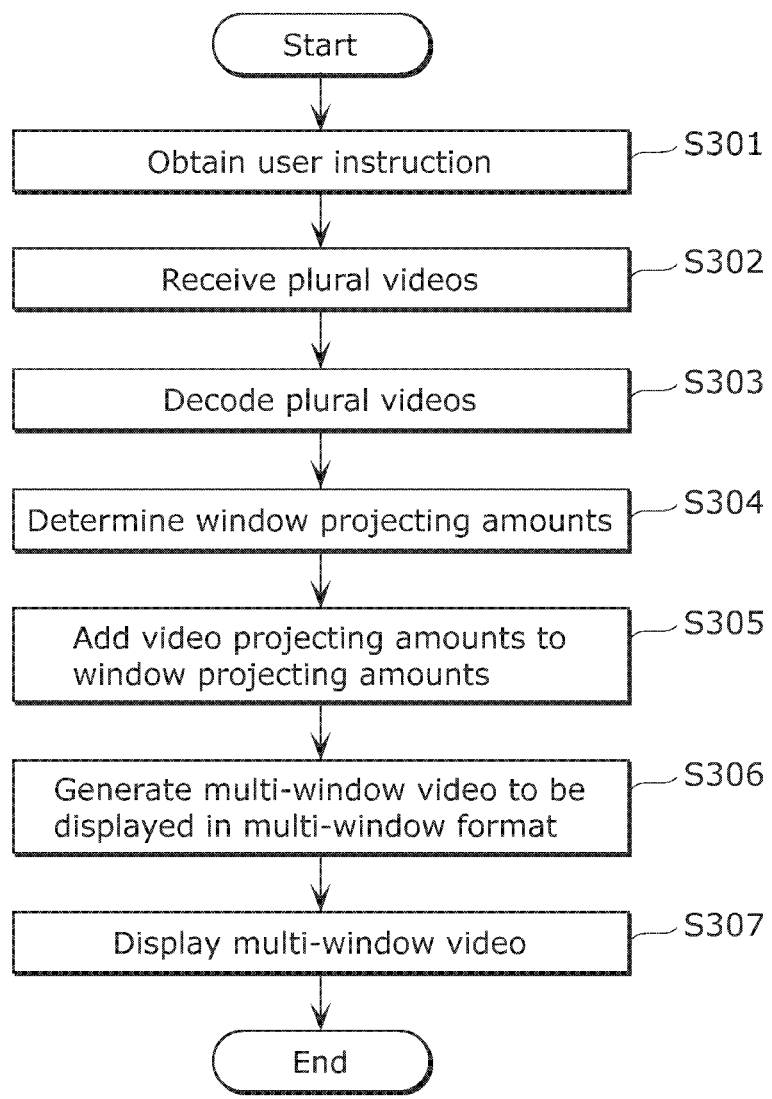
FIG. 7 is a flowchart illustrating a third example of operation of the video display apparatus according to the embodiment.

FIG. 7 is a flowchart illustrating operation of the video display apparatus 100 illustrated in FIG. 6. First, the user IF unit 104 obtains a user instruction (S301). Further, the receiving unit 101 receives plural videos (S302).

Next, the decoding unit 105 decodes the plural videos received by the receiving unit 101 (S303). Thereafter, the decoding unit 105 stores the decoded plural videos into the storage unit 106. The decoding unit 105 may decode only a coded video among the plural videos received by the receiving unit 101. The receiving unit 101 may directly store a video which is not coded, into the storage unit 106.

Next, the control unit 103 determines a window projecting amount of each of plural windows in which the plural videos are to be displayed (S304). Next, the control unit 103 adds a video projecting amount to a window projecting amount (S305). The addition at this time may not be simple addition, but weighting addition. Specifically, the control unit 103 may assign weights to a video projecting amount or a window projecting amount, and add the amounts.

Next, the video processing unit 107 reads plural videos from the storage unit 106. Thereafter, the video processing unit 107 generates a multi-window video for displaying the plural videos in the multi-window format (S306). At this time, the video processing unit 107 generates a multi-window video such that in each of plural windows, a video appears to be projecting or receding by an amount obtained by adding a video projecting amount to a window projecting amount. Thereafter, the video processing unit 107 stores the multi-window video into the storage unit 108.

Next, the display unit 102 reads the multi-window video from the storage unit 108. Finally, the display unit 102 displays the multi-window video (S307).

In the above manner, the plural videos each appear to be projecting or receding by an amount obtained by adding a video projecting amount to a window projecting amount. Furthermore, plural videos are appropriately displayed in the multi-window format after being subjected to decoding processing and video signal processing.

It should be noted that the control unit 103 may include the decoding unit 105, the video processing unit 107, and the two storage units 106 and 108. Further, the control unit 103 may have functions of the decoding unit 105, the video processing unit 107, and the two storage units 106 and 108.

Figure 8:
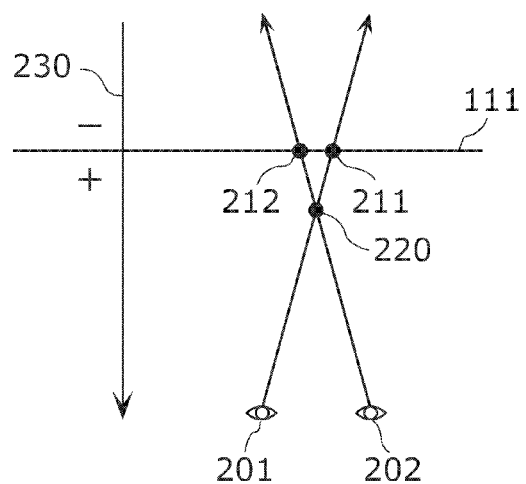
FIG. 8 is a conceptual diagram illustrating a first example of an amount of projection according to the embodiment.

FIG. 8 is a conceptual diagram illustrating a first example of an amount of projection in the video display apparatus 100 illustrated in FIG. 6, for instance. FIG. 8 illustrates an example in which a video appears to be projecting.

A screen 111 illustrated in FIG. 8 is a screen of the display unit 102 of the video display apparatus 100. A left video presented to a user's left eye 201 and a right video presented to a user's right eye 202 are displayed on the screen 111.

A position 211 on the screen 111 is a position where part of a left video is displayed. A position 212 on the screen 111 is a position where part of a right video is displayed. Similar images are displayed at the two positions 211 and 212. Specifically, the images appear to be displaced according to an amount of parallax.

This allows a user to recognize an image at a position 220. In other words, the user recognizes the image projecting in a projecting direction 230.

Figure 9:
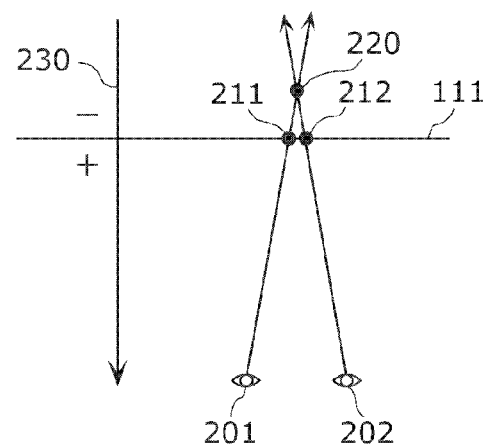
FIG. 9 is a conceptual diagram illustrating a second example of an amount of projection according to the embodiment.

FIG. 9 is a conceptual diagram illustrating a second example of an amount of projection in the video display apparatus 100 illustrated in FIG. 6, for instance. FIG. 9 illustrates an example in which a video appears to be receding.

The screen 111 illustrated in FIG. 9 is a screen of the display unit 102, as with the case of FIG. 8. A left video and a right video are displayed on the screen 111. The position 211 is a position at which part of the left video is displayed. The position 212 is a position at which part of the right video is displayed. Similar images are displayed at the two positions 211 and 212.

This allows the user to recognize an image at the position 220. In other words, the user recognizes the image receding in a direction opposite to the projecting direction 230. In this manner, the display unit 102 can display a video such that the video appears to be projecting or receding due to parallax.

It should be noted that the projecting direction 230 illustrated in FIGS. 8 and 9 indicates a direction in which a video is projecting out of the screen 111 and an amount of projection of the video therefrom. Here, regarding the amount of projection, the direction from the screen 111 toward the user is represented by the positive (plus), and the opposite direction is represented by the negative (minus). In this way, the amount in a receding direction may be represented by the amount of projection having a negative value.

Figure 10:
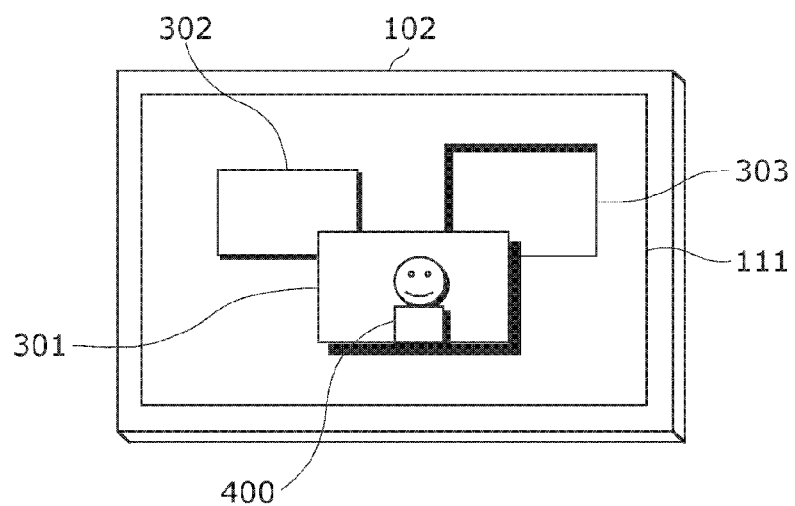
FIG. 10 illustrates a first example of display according to the embodiment.

FIG. 10 illustrates a first example of display by the video display apparatus 100 illustrated in FIG. 6, for instance. In FIG. 10, three windows 301, 302, and 303 are displayed on the screen 111 of the display unit 102. A video 400 to appear in the window 301 is displayed in the window 301. It should be noted that videos (not illustrated) to appear in the windows 302 and 303 are displayed in the windows, respectively.

In FIG. 10, the window 301 is displayed in the foreground. The windows 302 and 303 are displayed behind the window 301.

The window 301 appears to be projecting by the largest window projecting amount. The window 302 appears to be projecting by the second largest window projecting amount. The window 303 appears to be projecting by the smallest window projecting amount. The window 303 appears to be receding.

Furthermore, the video 400 appears to be projecting by an amount obtained by adding the video projecting amount of the video 400 to the window projecting amount of the window 301.

The control unit 103 of the video display apparatus 100 can display plural videos on the display unit 102 in a format as illustrated in FIG. 10.

Figure 11:
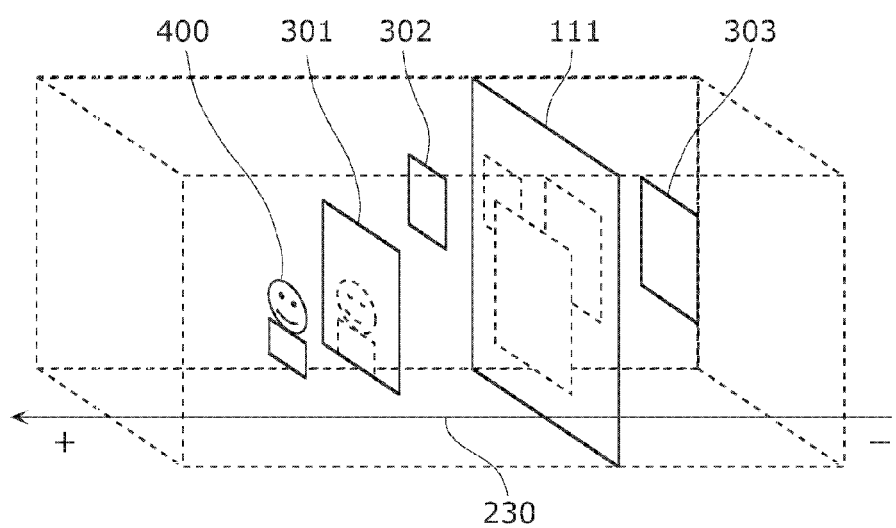
FIG. 11 is a conceptual diagram illustrating amounts of projection of windows according to the embodiment.

FIG. 11 is a conceptual diagram illustrating window projecting amounts in the display example illustrated in FIG. 10. As illustrated in FIG. 11, the windows 301, 302, and 303 appear to be projecting or receding in accordance with the front/back relationship of the windows. Furthermore, the video 400 appears to be projecting by an amount obtained by adding a video projecting amount to a window projecting amount.

It should be noted that if the video projecting amount of the video 400 is negative (minus), the video 400 appears to be receding from the window 301.

In this manner, the amount of projection when a video is displayed is adjusted based on a window projecting amount. Thus, plural videos are displayed in a wider variety of expression forms.

It should be noted that the placement and the window projecting amounts of the windows 301, 302, and 303 illustrated in FIG. 11 may be changed based on user instructions.

Furthermore, information on the changed placement and the changed window projecting amounts may be stored into the storage unit 108. In this case, the control unit 103 may read the placement and the window projecting amounts stored in the storage unit 108 at power-on or when the display is changed from another format to the multi-window format. The control unit 103 may determine the placement and window projecting amounts of the windows 301, 302, and 303, in accordance with the placement and the window projecting amounts which have been read.

Furthermore, the control unit 103 may determine window projecting amounts, based on the front/back relationship of the windows. On the contrary, the control unit 103 may determine the front/back relationship of the windows, based on the window projecting amounts. It should be noted that the front/back relationship of windows means preferential display ordering of windows when plural windows overlap. A front window is displayed more preferentially than a window therebehind. A window in the foreground is displayed most preferentially.

As illustrated in the examples in FIGS. 10 and 11, the video display apparatus 100 displays plural videos in the multi-window format, to improve the appearance of the display and the visibility of the plural videos. Furthermore, the video display apparatus 100 utilizes the projecting direction, to improve its expressivity.

Figure 12:
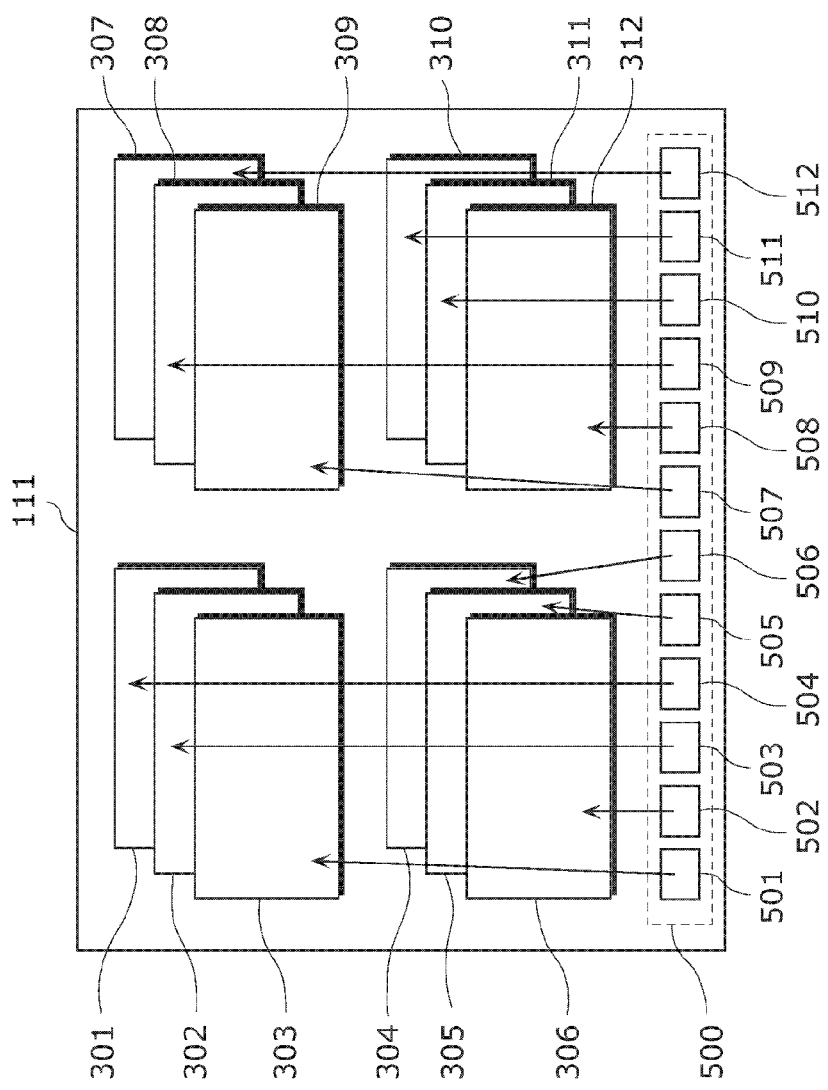
FIG. 12 illustrates a second example of display according to the embodiment.

FIG. 12 illustrates a second example of the display by the video display apparatus 100 illustrated in FIG. 6, for instance. The control unit 103 may determine a multi-window layout as shown in FIG. 12, in accordance with attributes of videos and/or user instructions.

Plural windows 301 to 312 are displayed on the screen 111 illustrated in FIG. 12. In addition, a navigation bar 500 is displayed on the screen 111. Furthermore, plural small windows 501 to 512 are displayed on the navigation bar 500. The plural small windows 501 to 512 are associated with the plural windows 301 to 312.

Specifically, the small window 501 is associated with the window 303. The small window 502 is associated with the window 306. The small window 503 is associated with the window 302. The small window 504 is associated with the window 301. The small window 505 is associated with the window 305. The small window 506 is associated with the window 304.

The small window 507 is associated with the window 309. The small window 508 is associated with the window 312. The small window 509 is associated with the window 308. The small window 510 is associated with the window 311. The small window 511 is associated with the window 310. The small window 512 is associated with the window 307.

The small windows 501 to 512 may be automatically associated with the windows 301 to 312. For example, the small windows 501 to 512 may be automatically assigned to the windows 301 to 312 according to categories.

The small windows 501 to 512 may be associated with the windows 301 to 312 in accordance with a user operation. For example, the small windows 501 to 512 may be assigned to the windows 301 to 312 by the drag and drop operation.

Specifically, in a state where the windows 301 to 312 are not displayed, the small window 501 is dragged and dropped at the position of the window 303 to thereby display the window 303. Then, the window 303 is associated with the small window 501.

Videos are reduced in size and displayed in the small windows 501 to 512 each as a motion video or a still image. These videos are received by the receiving unit 101. In addition, the videos may be each displayed in 2D or 3D.

A video is displayed in each of the windows 301 to 312 in 2D or 3D. The control unit 103 determines whether a video is to be displayed in 3D, and displays the video on the display unit 102, based on the determination.

The control unit 103 sets a window projecting amount for each of the windows 301 to 312, thereby improving a stereoscopic effect. Preferably, the control unit 103 determines the window projecting amounts in a predetermined range. Accordingly, the video display apparatus 100 can prevent failure of the stereoscopic display and/or a 3D sickness.

The control unit 103 may place the window added last, in the background or the foreground. Then, the control unit 103 may set an appropriate window projecting amount based on a front/back relationship. Furthermore, the control unit 103 may set a window projecting amount in accordance with a user instruction via the user IF unit 104.

Furthermore, the control unit 103 may adjust a video projecting amount, based on the set window projecting amount. For example, the control unit 103 may decrease a video projecting amount so that the video may not be excessively projecting.

The plural window projecting amounts associated with the windows 301 to 312 may be equal to or different from one another. Furthermore, plural window sizes of the windows 301 to 312 may be equal to or different from one another.

Figure 13:
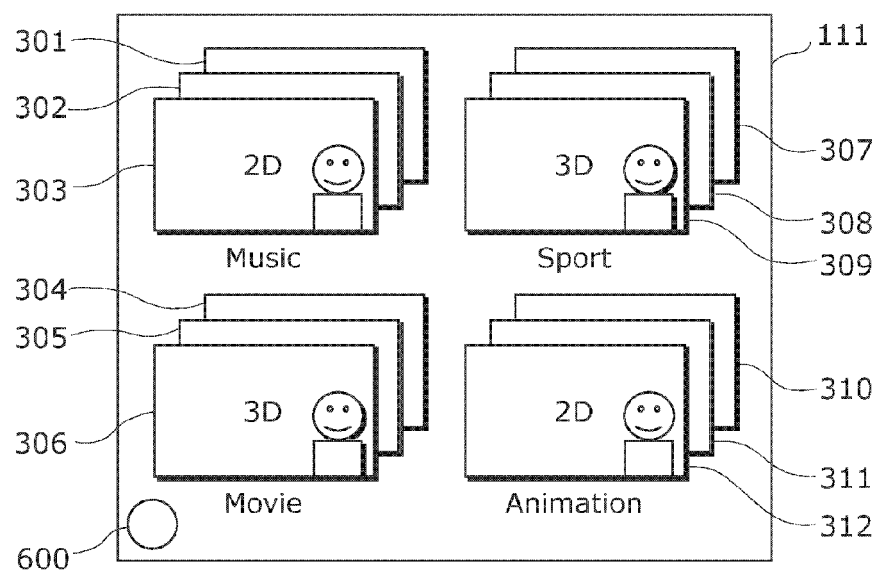
FIG. 13 illustrates a third example of display according to the embodiment.

FIG. 13 illustrates a third example of display by the video display apparatus 100 illustrated in FIG. 6, for instance. The windows 301 to 312 are classified into plural categories, and displayed on the screen 111 illustrated in FIG. 13. In this manner, plural videos may be displayed according to the categories.

Furthermore, in FIG. 13, music videos (such as music programs) and cartoon (animation) videos are displayed in 2D, and movie videos and sport videos are displayed in 3D. In this way, the control unit 103 may determine whether to display a video in 3D, according to the category thereof.

The control unit 103 may determine a window projecting amounts according to categories. Furthermore, the control unit 103 may determine a window projecting amount, based on a video projecting amount or sound, rather than a category. The control unit 103 may control the front/back relationship of windows, based on window projecting amounts.

A video projecting amount and a sound volume vary as time elapses. Thus, if the display of the screen 111 is changed according to a variation in video projecting amount and sound volume, the display of the screen 111 may change in succession, which lowers visibility. Accordingly, the control unit 103 may determine window projecting amounts and a front/back relationship only when the entire display of the screen 111 changes. Alternatively, the control unit 103 may determine window projecting amounts and a front/back relationship when the user manually makes a designation.

For example, a button 600 is displayed on the screen 111. The button 600 is displayed on the screen 111 as a GUI. The control unit 103 may determine window projecting amounts and a front/back relationship upon the user pressing the button 600.

Furthermore, each of the windows 301 to 312 illustrated in FIG. 13 may be a fixed, unmovable window having an unchangeable size. The control unit 103 may associate plural videos with the windows 301 to 312, according to categories.

Figure 14:
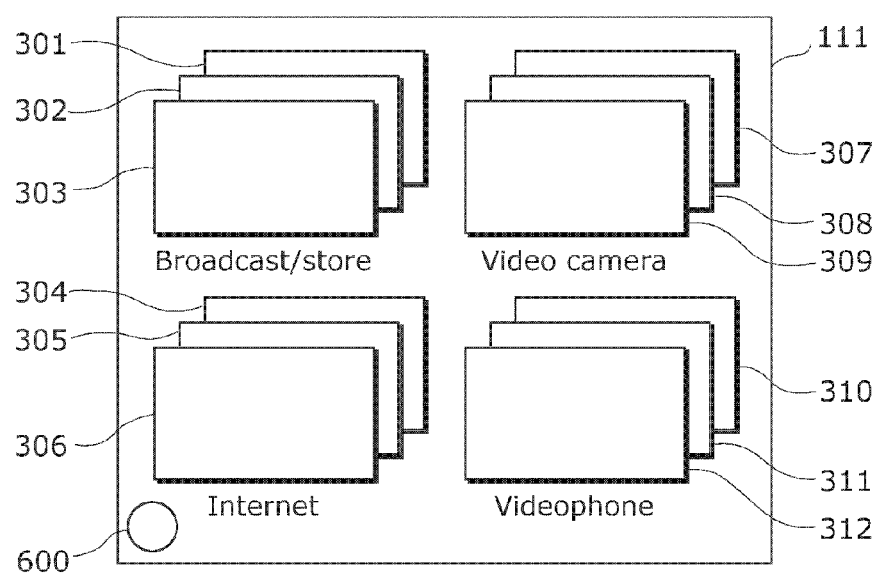
FIG. 14 illustrates a fourth example of display according to the embodiment.

FIG. 14 illustrates a fourth example of display by the video display apparatus 100 illustrated in FIG. 6, for instance. The windows 301 to 312 are classified according to where videos are obtained, and displayed on the screen 111 illustrated in FIG. 14. Where videos are obtained means where the receiving unit 101 obtains the videos. In the example of FIG. 14, the windows 301 to 312 are classified into four sources where the videos are obtained, namely, broadcast/store, a video camera, the Internet, and a videophone.

As with the example in FIG. 13, each of the windows 301 to 312 may be a fixed, unmovable window having an unchangeable size. The control unit 103 may associate plural videos with the windows 301 to 312 according to where the videos are obtained.

In this manner, the windows 301 to 312 may be classified not based on categories, but based on other attributes. For example, the control unit 103 may classify the windows 301 to 312, based on the resolution of videos, the degree of favorite, a video projecting amount, sound, a format, and others.

Figure 15:
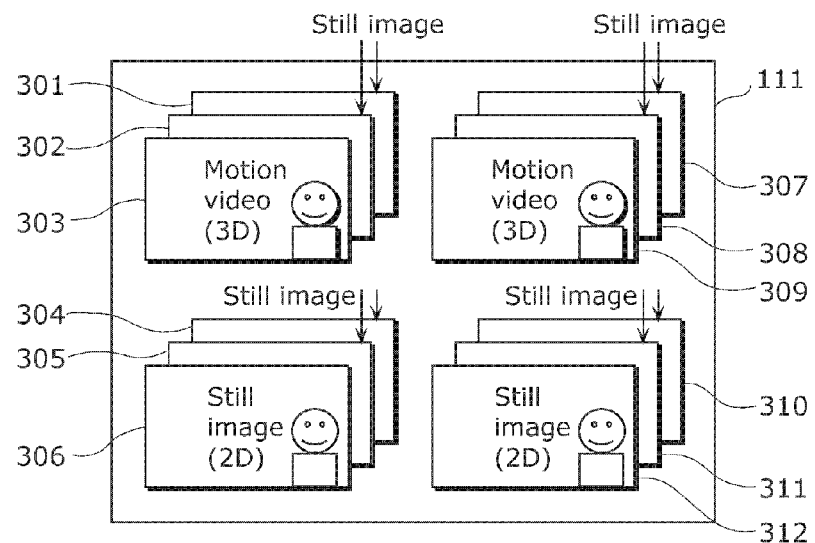
FIG. 15 illustrates a fifth example of display according to the embodiment.

FIG. 15 illustrates a fifth example of display by the video display apparatus 100 illustrated in FIG. 6, for instance. The windows 301 to 312 are classified based on a predetermined attribute, and displayed on the screen 111 in FIG. 15. Videos in the windows 303 and 309 only are displayed as motion videos. The windows 303 and 309 are windows in the foreground among the classified windows, and windows for 3D videos. Videos in other windows 301, 302, 304 to 308, and 310 to 312 are displayed as still images.

In this manner, the control unit 103 may control the display such that a video is displayed, as a motion video, only in a window having the largest window projecting amount. Here, a window having the largest window projecting amount may be a window having the largest window projecting amount among windows classified in a predetermined manner based on categories or the like.

The control unit 103 may control the display such that only a 3D video is displayed as a motion video. Further, the control unit 103 may control the display such that only a 3D video to appear in a window having a largest window projecting amount is displayed as a motion video.

The control unit 103 may control the display such that a video is displayed in 3D only in a window having the largest window projecting amount. Here, a window having the largest window projecting amount may be a window having the largest window projecting amount classified in a predetermined manner based on categories or the like.

The control unit 103 may control the display such that only a motion video is displayed in 3D. Further, the control unit 103 may control the display such that only a motion video to appear in a window having the largest a window projecting amount is displayed in 3D.

It should be noted that, the control unit 103 executes video processing on all the areas of the windows 301 to 312 in a typical example. For example, some of the areas of the window 302 are covered by the window 303. The control unit 103, however, needs to execute video processing on all the areas of the window 302. Thus, the control unit 103 displays a video in the window 302 in a format which requires a light load, such as a still image, thereby reducing the load.

Figure 16:
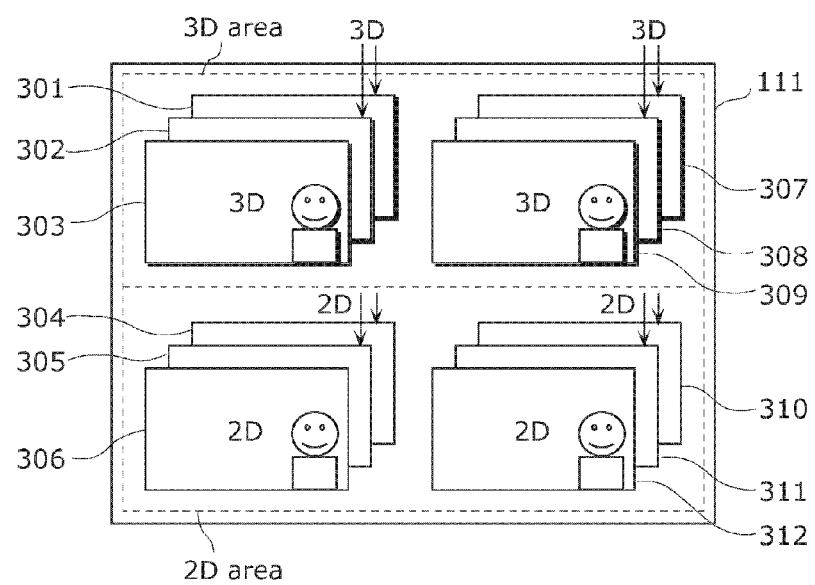
FIG. 16 illustrates a sixth example of display according to the embodiment.

FIG. 16 illustrates a sixth example of display by the video display apparatus 100 illustrated in FIG. 6, for instance. The screen 111 in FIG. 16 includes a 3D area and a 2D area. Videos in the windows 301 to 303 and 307 to 309 in the 3D area are displayed in 3D. Videos in the windows 304 to 306 and 310 to 312 in the 2D area are displayed in 2D.

The windows 301 to 312 illustrated in FIG. 16 are each placed in accordance with user instructions. Then, videos are displayed in 2D or 3D according to the placement of each of the windows 301 to 312.

If a window is placed over the boundary between the 3D and 2D areas, the control unit 103 may determine whether to display a video to appear in the window in 3D or 2D, according to the size of an area where the window is over the 3D or 2D area.

For example, if an area where a window is over the 3D area is larger than an area where the window is over the 2D area, the control unit 103 may control the display such that a video to appear in the window is displayed in 3D. If an area where a window is over the 3D area is the same as an area where the window is over the 2D area, the control unit 103 may control the display such that a video to appear in the window is displayed in a predetermined format selected from among 3D and 2D.

Alternatively, if a window is placed over the boundary between the 3D and 2D areas, the control unit 103 may display a video to appear in the window in a predetermined format selected from among 3D and 2D, irrespective of an area where the window is over the 3D or 2D area. Alternatively, the control unit 103 may control the placement of windows such that no window is placed over the boundary between the 3D and 2D areas.

Furthermore, the control unit 103 may determine a window projecting amount according to the placement of a window. For example, the control unit 103 may determine a window projecting amount for each area such that a window projecting amount for the right area on the screen 111 is larger than a window projecting amount for the left area on the screen 111. The same window projecting amount may be used for each window in the same area.

The control unit 103 may determine whether to display a video in 3D and determine a window projecting amount, based on respective settings for plural areas. Such settings are obtained via the user IF unit 104. The control unit 103 may control the setting of a window projecting amount to prevent a setting of a window projecting amount for a specific area among the plural areas from being changed from an initial value. The control unit 103 can prevent unsuccessful display of a stereoscopic video by limiting the flexibility in setting a window projecting amount.

Figure 17:
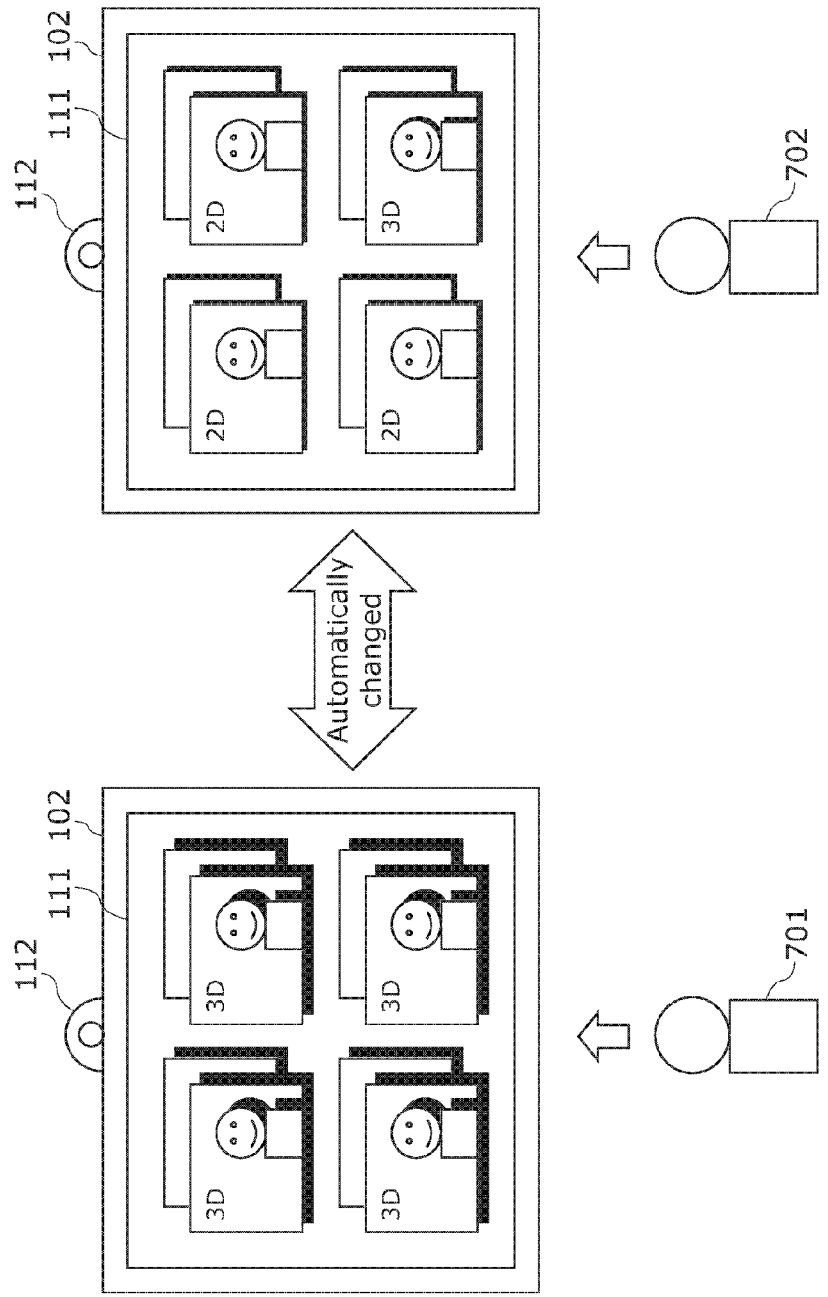
FIG. 17 illustrates a seventh example of display according to the embodiment.

FIG. 17 illustrates a seventh example of display by the video display apparatus 100 illustrated in FIG. 6, for instance. An appearance is changed in the example in FIG. 17 according to a person included in a specific video.

A camera 112 is provided at the upper portion of the display unit 102. The camera 112 captures a video of a user 701 or 702 who is looking at the screen 111 of the display unit 102. The camera 112 may be a part of the receiving unit 101. Alternatively, the receiving unit 101 may obtain a captured video from the camera 112.

The control unit 103 identifies whether the user 701 or 702 is included in the captured video. Then, the control unit 103 changes an appearance, according to the user 701 or 702.

For example, if the user 701 is included in the captured video, the control unit 103 controls the display such that videos in all the windows displayed in the front are displayed in 3D. Then, the control unit 103 sets each window projecting amount to a comparatively large value.

On the other hand, if the user 702 is included in the captured video, the control unit 103 controls the display such that at least one of videos in windows displayed in the front is displayed in 3D. Then, the control unit 103 sets each window projecting amount to a comparatively small value.

In this manner, the control unit 103 may change an appearance, according to a person included in a specific video. It should be noted that the control unit 103 may change an appearance, according to a subject other than a person. For example, the control unit 103 may identify a playing tool, a study tool, or 3D glasses from a specific video, and change the appearance.

Figure 18:
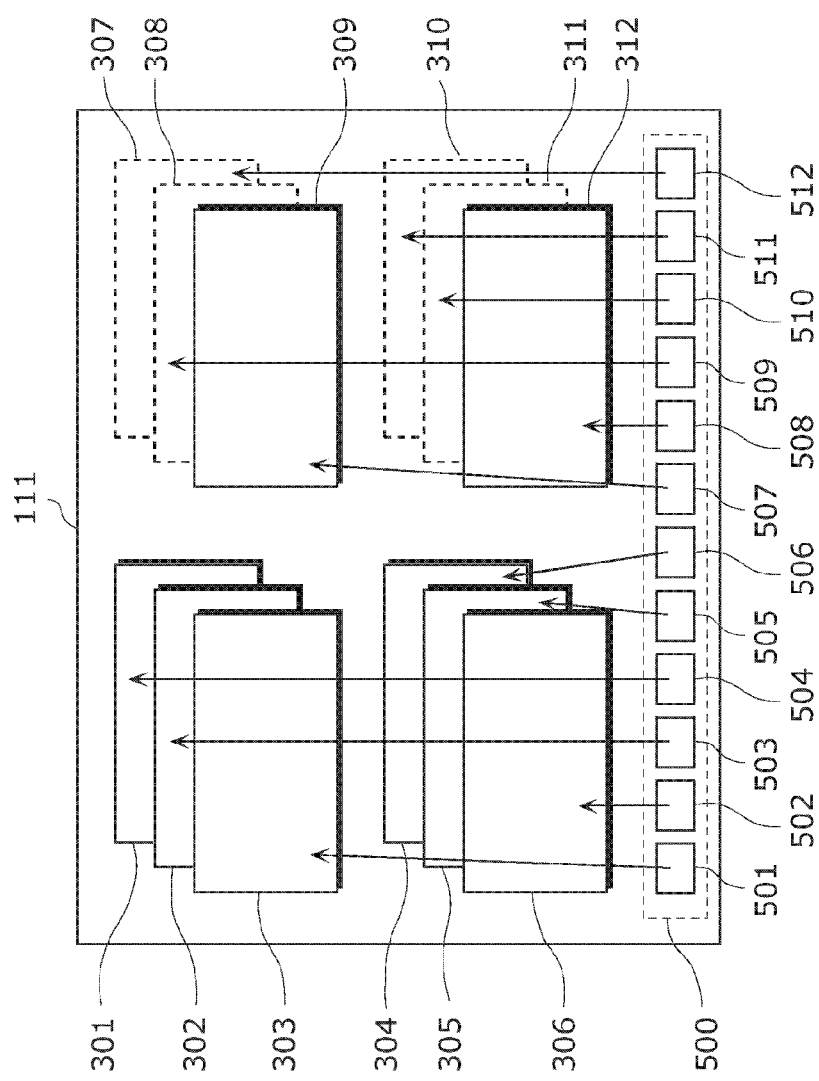
FIG. 18 illustrates an eighth example of display according to the embodiment.

FIG. 18 illustrates an eighth example of display by the video display apparatus 100 illustrated in FIG. 6, for instance. As in the example in FIG. 18, the control unit 103 changes an appearance in the multi-window format, according to the load on the video display apparatus 100.

The load on the video display apparatus 100 changes according to the sizes of windows, the number of windows, the sizes of videos, and the like. Furthermore, the load on the video display apparatus 100 also changes due to the number of windows where a video is displayed in 3D or as a motion video. The control unit 103 calculates the load from information, including the sizes of windows, and the like. The control unit 103 may calculate the sum total of the sizes of windows as a load. If the load is greater than a predetermined threshold value, the control unit 103 changes the appearance to another appearance which requires a lighter load.

For example, if the load is greater than the predetermined threshold value, the control unit 103 removes a window. More specifically, the control unit 103 removes the windows 307, 308, 310, and 311, as in FIG. 18. Consequently, plural videos are displayed in an appearance which requires a lighter load.

If the load is heavy, the control unit 103 may control the display such that the size of a window is not changed. Alternatively, if the load is heavy, the control unit 103 may control the display such that a video is not displayed as a motion video. Alternatively, if the load is heavy, the control unit 103 may stop the display. Alternatively, if the load is heavy, the control unit 103 may turn off the sound.

Alternatively, the control unit 103 may remove a window where a video is displayed in 2D, among the windows 301 to 312. Alternatively, the control unit 103 may remove a window having the smallest window projecting amount among the windows 301 to 312. Alternatively, the control unit 103 may remove a window having the largest size, among the windows 301 to 312.

Figure 19:
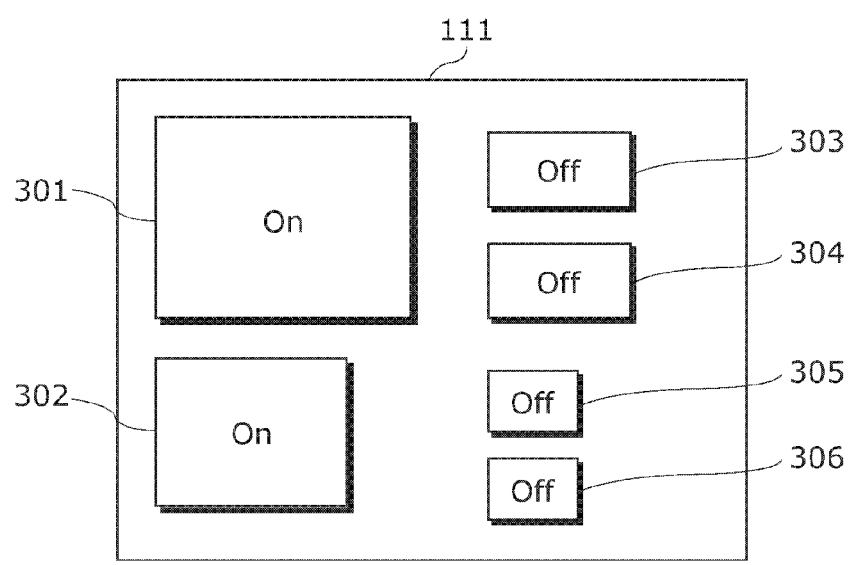
FIG. 19 illustrates a ninth example of display according to then embodiment.

FIG. 19 illustrates a ninth example of display by the video display apparatus 100 illustrated in FIG. 6, for instance. The control unit 103 may execute video signal processing on a window having a large size.

For example, in FIG. 19, the windows 301 and 302 each have a size greater than a predetermined threshold value. In this case, the control unit 103 controls the display such that videos are displayed in 3D in the windows 301 and 302. Then, the control unit 103 controls the display such that videos are displayed in 2D in other windows 303 to 306.

Alternatively, the control unit 103 controls the display such that videos are displayed as motion videos in the windows 301 and 302. Then, the control unit 103 controls the display such that videos are displayed as still images in the windows 303 to 306. Alternatively, the control unit 103 may convert only videos in the windows 301 and 302 so that the videos will appear vividly.

Alternatively, the control unit 103 may execute error concealment (error concealment control) only on videos to appear in the windows 301 and 302. For example, if a right video has an error, the control unit 103 conceals the error by displaying a left video on the display unit 102, as the right video.

The above allows reduction in the load. The control unit 103 may execute the above-described control according to the load, not based on the size of a window. For example, the control unit 103 may execute error concealment control only when the load is light.

Alternatively, the control unit 103 may execute above-described control in accordance with a combination of the size of a window and the load. For example, when the load is heavy, the control unit 103 may execute, for instance, 3D reproduction, motion video reproduction, image quality enhancement, and/or error concealment control only on a window having a large size.

Figure 20:
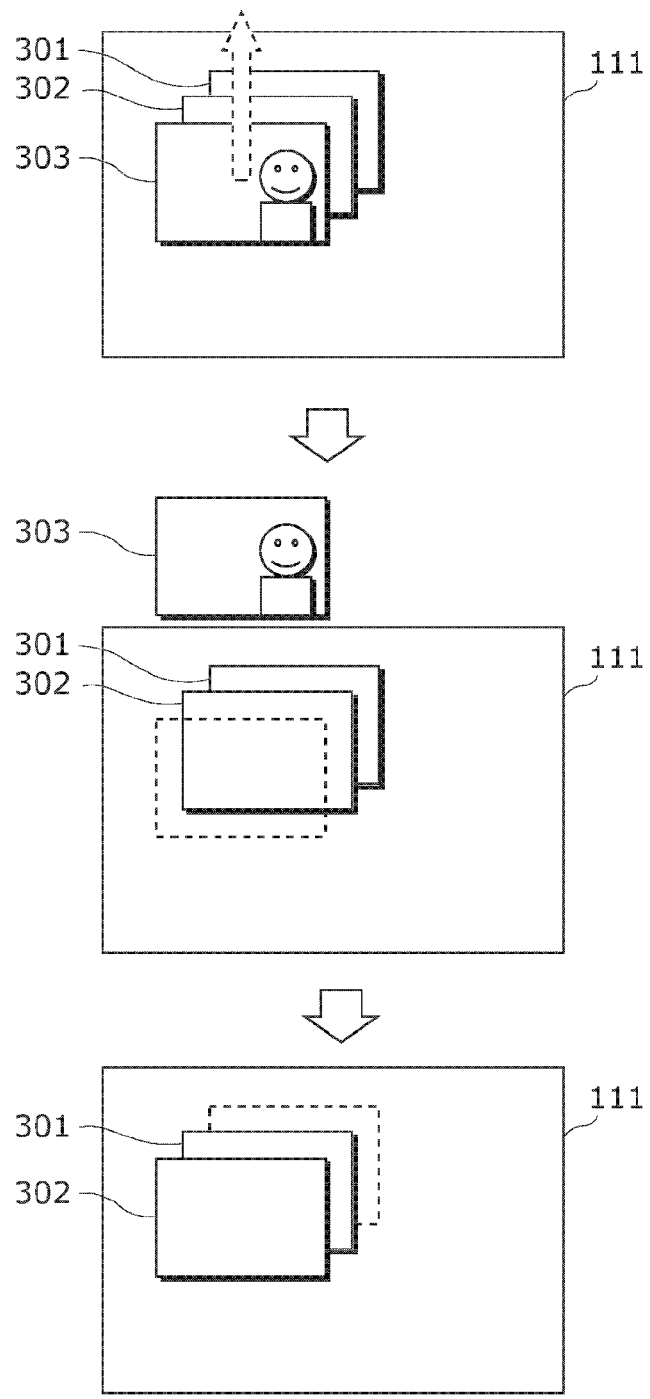
FIG. 20 illustrates a tenth example of display according to the embodiment.

FIG. 20 illustrates a tenth example of display by the video display apparatus 100 illustrated in FIG. 6, for instance. First, the control unit 103 displays three windows 301 to 303 on the screen 111. Then, the control unit 103 moves the window 303 out of the screen 111 in accordance with a user instruction. For example, moving the window 303 is executed by a drag operation via the user IF unit 104. In this manner, the control unit 103 removes the window 303.

The window 303 may be removed by being moved to a specific area of the screen 111, instead of moved out of the screen 111. Furthermore, the window 303 may be removed when a motion video ends. In other words, the control unit 103 may remove the window 303 when an event is generated for the window 303.

The control unit 103 increases a window projecting amount of the window 302 behind the window 303. For example, the control unit 103 determines the window projecting amount of the window 302 to be the same value as the window projecting amount of the window 303 prior to the removal of the window. Furthermore, the control unit 103 determines the window projecting amount of the window 301 to be the same value as the window projecting amount of the window 302 prior to the change.

It should be noted that the control unit 103 may decrease the window projecting amount of the window 302 in front of the window 301 if the window 301 is removed. In this case, the control unit 103 determines the window projecting amount of the window 302 to be the same value as the window projecting amount of the window 301 prior to the removal of the window. Furthermore, the control unit 103 determines the window projecting amount of the window 303 to be the same value as the window projecting amount of the window 302 prior to the change.

The control unit 103 appropriately adjusts window projecting amounts through the above operation, to reduce the difference of plural window projecting amounts. Thus, window projecting amounts are regulated. Consequently, visibility improves.

Figure 21:
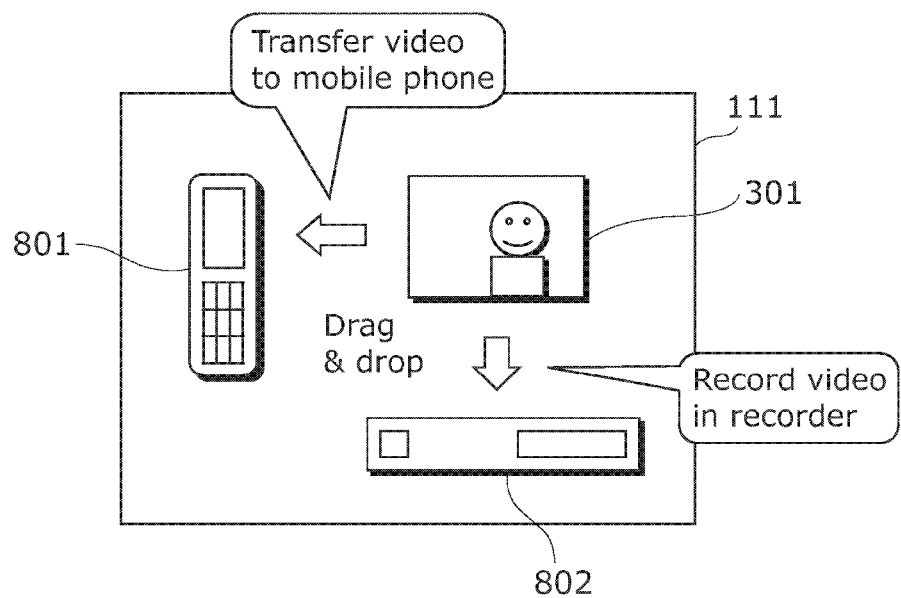
FIG. 21 illustrates an eleventh example of display according to the embodiment.

FIG. 21 illustrates an eleventh example of display by the video display apparatus 100 illustrated in FIG. 6, for instance. The control unit 103 displays a virtual image 801 of a mobile phone, a virtual image 802 of a recorder, and the window 301 on the screen 111. A user moves the window 301 to a given position of the screen 111 by the drag and drop operation. Specifically, the user IF unit 104 obtains an instruction to move the window 301. Then, the control unit 103 moves the window 301 in accordance with the instruction.

If the window 301 is moved onto the virtual image 801, the control unit 103 transfers a video in the window 301 to a mobile phone. If the window 301 is moved onto the virtual image 802, the control unit 103 causes a recorder to record a video in the window 301. In this manner, the control unit 103 may execute processing along with the movement of the window 301. Then, the control unit 103 may remove the window 301 after the transfer of the video or completion of recording the video.

Consequently, operability improves. It should be noted that the control unit 103 may change the window projecting amount of another window after removing the window 301, as with the example illustrated in FIG. 20.

Figure 22:
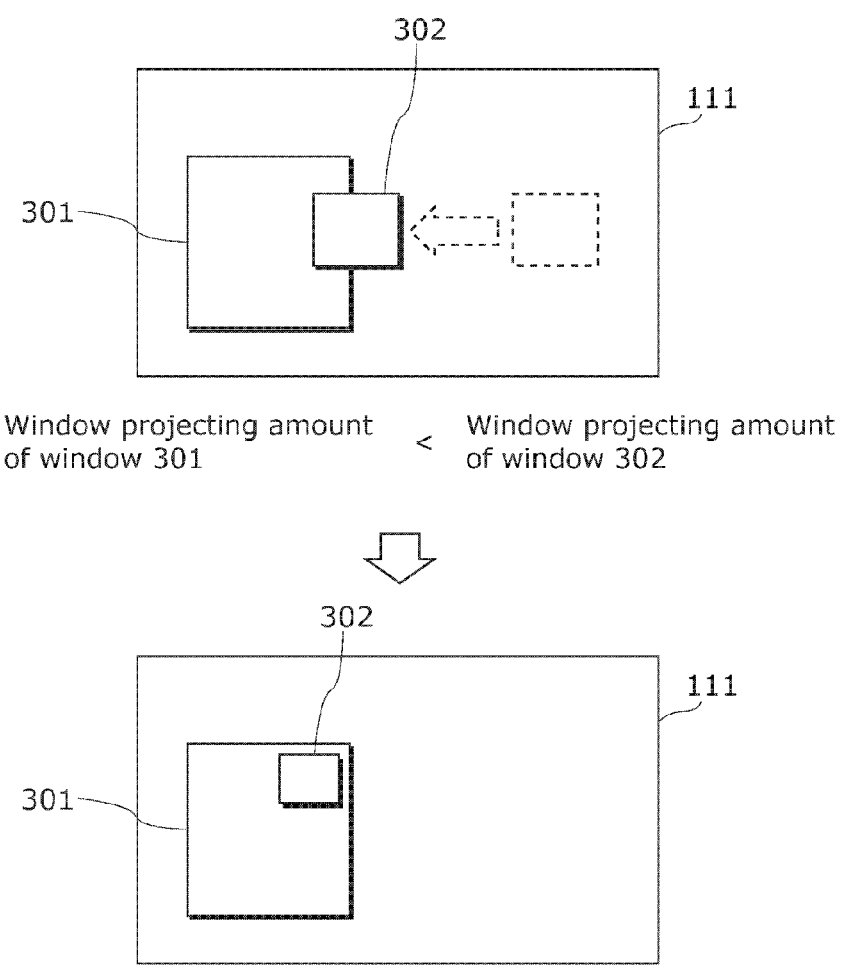
FIG. 22 illustrates a twelfth example of display according to the embodiment.

FIG. 22 illustrates a twelfth example of display by the video display apparatus 100 illustrated in FIG. 6, for instance. In the example in FIG. 22, the windows 301 and 302 are displayed on the screen 111. In this example, the window projecting amount of the window 301 is smaller than the window projecting amount of the window 302.

The user IF unit 104 obtains an instruction to move the window 302. Then, the control unit 103 moves the window 302 in accordance with the instruction. When the window 302 approaches the window 301 to a certain degree, the window 302 is inset in the window 301. Specifically, the control unit 103 controls the display such that the window 302 is placed at a predetermined position relative to the window 301. Such a display format is also referred to as "picture in picture" (PinP).

When the distance between the window 301 and the window 302 is shorter than a predetermined distance, the control unit 103 may control the display such that the window 302 is placed at a predetermined relative position. Alternatively, when the windows 301 and 302 partially overlap, the control unit 103 may control the display such that the window 302 is placed at a predetermined relative position.

The control unit 103 may combine a sound effect with the inset operation. This further improves operability. The video display apparatus 100 may include an output unit such as a speaker which outputs sound. Furthermore, when moving the inset window 302 in accordance with a user instruction, the control unit 103 may control the display to cause the operation of the window 302 to be opposite to the inset operation.

The example in FIG. 22 illustrates a case where the window 301 has a smaller window projecting amount than the window 302. However, the window 301 may have a window projecting amount larger than or equal to the window projecting amount of the window 302. When the window 302 approaches the window 301, the control unit 103 may cause the window projecting amount of the window 302 to be larger than the window projecting amount of the window 301.

Figure 23:
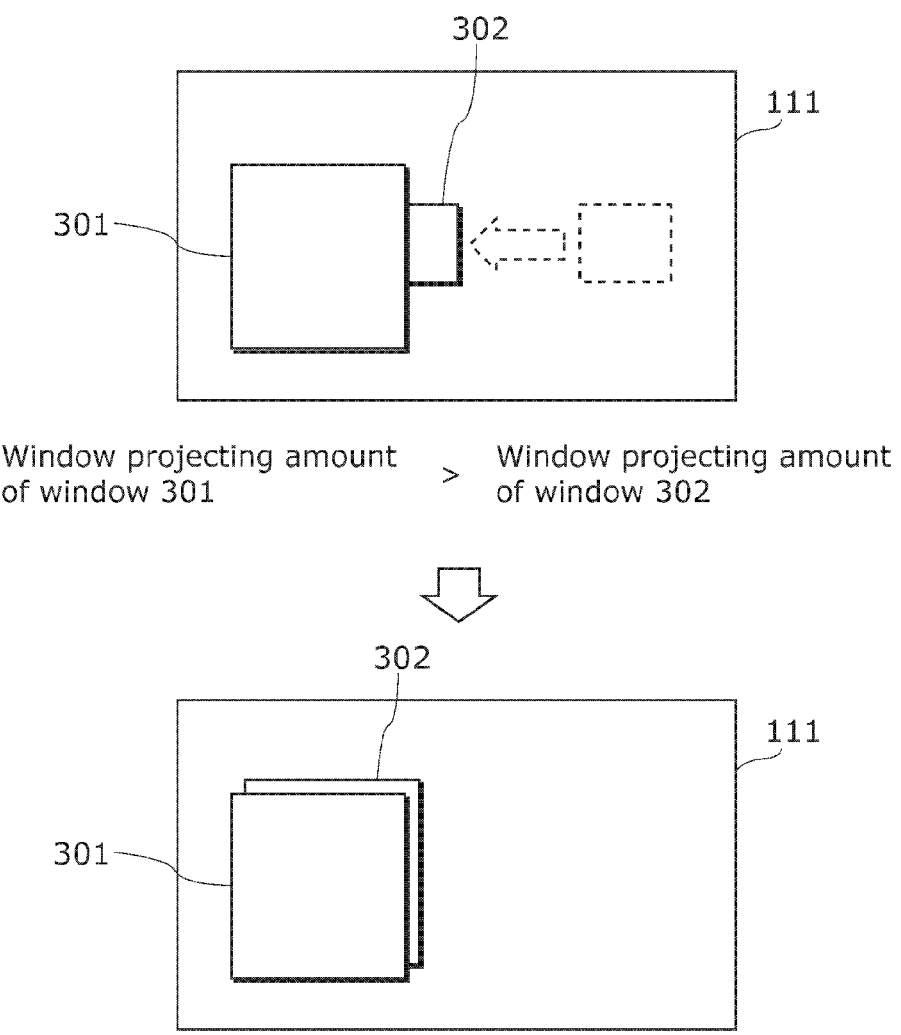
FIG. 23 illustrates a thirteenth example of display according to the embodiment.

FIG. 23 illustrates a thirteenth example of display by the video display apparatus 100 illustrated in FIG. 6, for instance. In the example in FIG. 23, the windows 301 and 302 are displayed on the screen 111. In this example, the window 301 has a larger window projecting amount than the window 302.

The user IF unit 104 obtains an instruction to move the window 302. Then, the control unit 103 moves the window 302 in accordance with the instruction. When the window 302 approaches the window 301 to a certain degree, the control unit 103 enlarges the window 302 and displays the enlarged window 302 on the screen 111 to prevent the window 302 from being covered by the window 301. For example, the control unit 103 causes the window 302 to have the same size as the window 301.

The control unit 103 may resize the window 302 when the distance between the windows 301 and 302 is shorter than a predetermined distance. Alternatively, the control unit 103 may resize the window 302 when the window 301 and the window 302 partially overlap.

At this time, the control unit 103 may control the display such that the window 302 is placed at a predetermined position relative to the window 301 as with the example in FIG. 22. Furthermore, a sound effect may be combined as with the example in FIG. 22. Furthermore, the control unit 103 may control the display such that the operation of the window 302 is opposite to the inset operation when moving the inset window 302 in accordance with a user instruction.

FIGS. 23 and 24 illustrate cases where the window projecting amount of the window 301 is basically different from the window projecting amount of the window 302. If the window projecting amount of the window 302 is the same as the window projecting amount of the window 301, the control unit 103 does not need to execute inset or resizing. In such a case, the control unit 103 may control the display such that the window 301 and the window 302 do not overlap.

For example, when the window 302 approaches the window 301, the control unit 103 may move the window 301 so that the window 301 is to be separate from the window 302.

Furthermore, only when the window projecting amount of the window 302 is the same as the window projecting amount of the window 301, the control unit 103 may execute inset or resizing. If the window projecting amount of the window 301 is different from the window projecting amount of the window 302, the control unit 103 does not need to execute inset or resizing.

If the window projecting amount of the window 302 is the same as the window projecting amount of the window 301, the control unit 103 may change the window projecting amount of the window 301 or 302, and execute inset or resizing.

FIG. 24 illustrates a fourteenth example of display by the video display apparatus 100 illustrated in FIG. 6, for instance. In the example in FIG. 24, the windows 301 and 302 are displayed on the screen 111. In this example, the window projecting amount of the window 301 is larger than the window projecting amount of the window 302.

The user IF unit 104 obtains an instruction to move the window 302. Then, the control unit 103 moves the window 302 in accordance with the instruction. In an area where the windows 301 and 302 overlap, a video to appear in the window 302 having a small window projecting amount is displayed.

Consequently, the control unit 103 prevents a video in the window 302 from being covered by the window 301.

Figure 25:
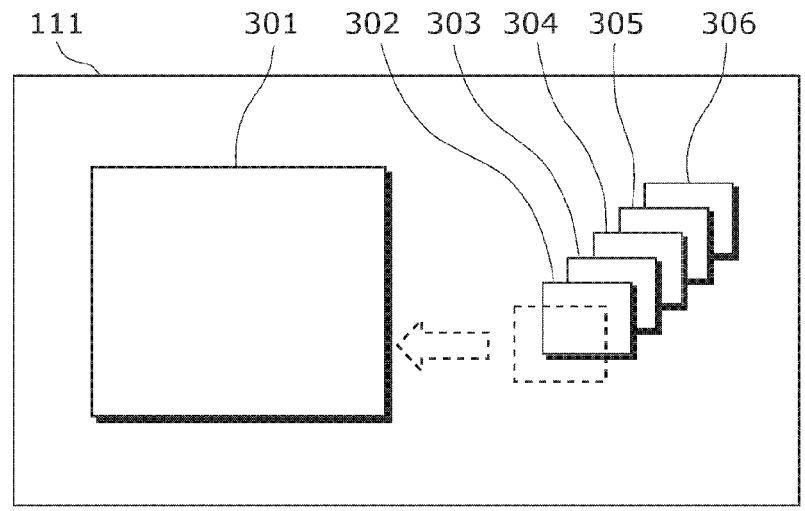
FIG. 25 illustrates a fifteenth example of display according to the embodiment.

FIG. 25 illustrates a fifteenth example of display by the video display apparatus 100 illustrated in FIG. 6, for instance. The control unit 103 enlarges the window 301 in the foreground, and displays the enlarged window on the screen 111. The control unit 103 displays a video in 3D in the window 301.

In this manner, the control unit 103 may display the window 301 in the foreground on the screen 111 in an appearance different from other windows 302 to 306. For example, the control unit 103 may increase only the window projecting amount of the window 301 to an amount larger than the window projecting amounts of other windows 302 to 306. Alternatively, a video may be displayed as a motion video only in the window 301 in the foreground. Alternatively, a video may be displayed in 3D only in the window 301 in the foreground.

The window 301 in the foreground tends to attract user's attention. The video display apparatus 100 changes the appearance of the window 301, thereby further improving visibility.

Figure 26:
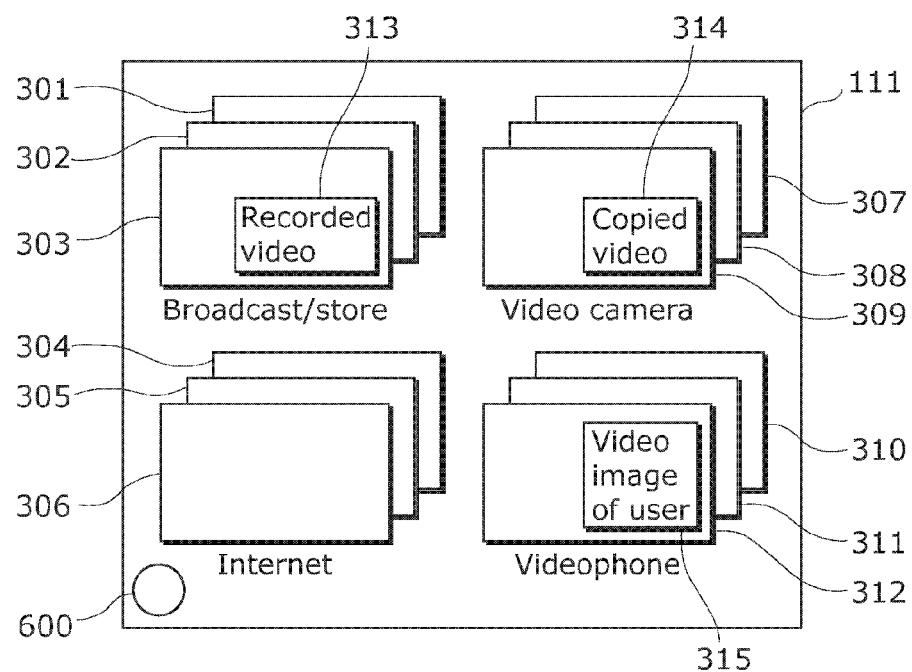
FIG. 26 illustrates a sixteenth example of display according to the embodiment.

FIG. 26 illustrates a sixteenth example of display by the video display apparatus 100 illustrated in FIG. 6, for instance.

The control unit 103 displays windows 313 to 315 according to events, such as recording and copying.

For example, if a recording event is generated, the control unit 103 displays the window 313 inside the window 303 for broadcasts. The control unit 103 displays a recorded video in the window 313. If a copying event is generated, the window 314 is displayed inside the window 309 for video cameras. The control unit 103 displays a copied video in the window 314. The control unit 103 may display the window 315 inside the window 312 for videophones, and display a video image of a user in the window 315.

In the example in FIG. 26, the windows 313 to 315 are displayed in the PinP format. Videos may be displayed in 3D in the windows 313 to 315. Furthermore, window projecting amounts larger than those of the windows 303, 309, and 312 serving as parent windows may be assigned to the windows 313 to 315 serving as child windows.

Consequently, the video display apparatus 100 can notify the user of the generation of an event. The video display apparatus 100 can improve the visibility of a notification by casing the notification to appear to be projecting.

Figure 27:
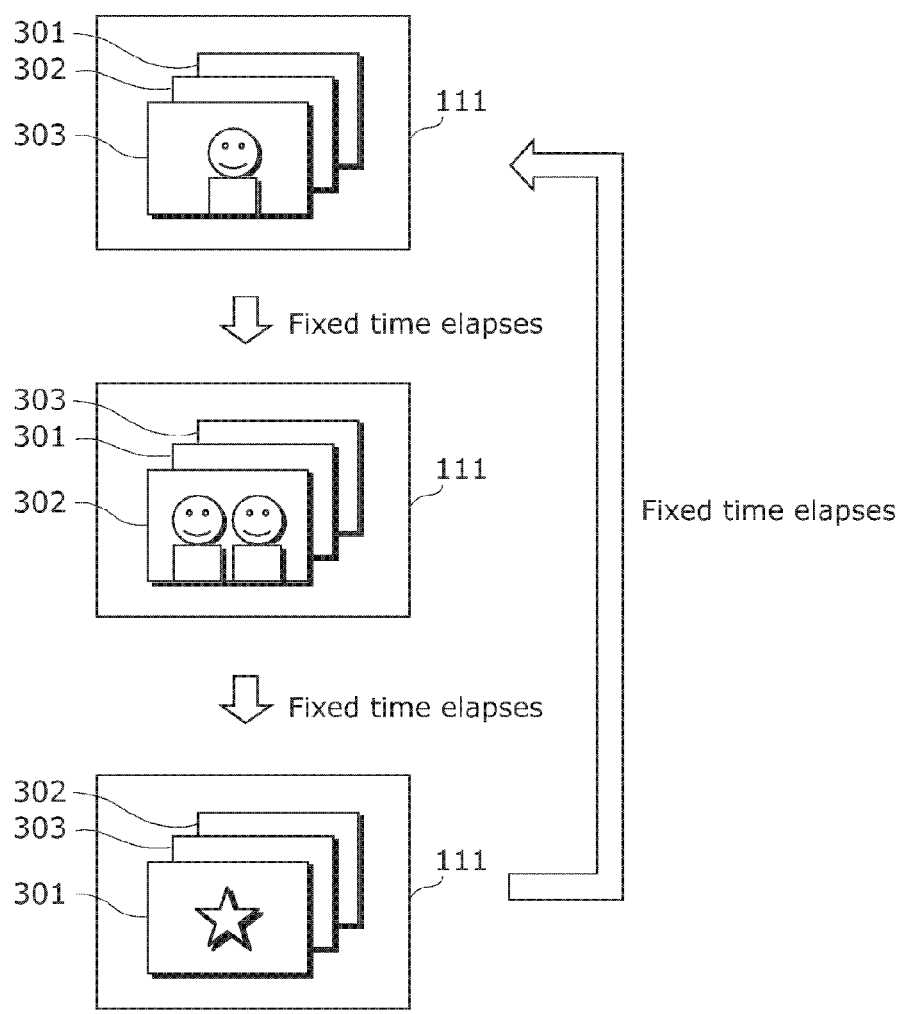
FIG. 27 illustrates a seventeenth example of display according to the embodiment.

FIG. 27 illustrates a seventeenth example of display by the video display apparatus 100 illustrated in FIG. 6, for instance. FIG. 27 illustrates an example in which a display is changed at fixed time intervals.

First, the windows 301 to 303 are displayed on the screen 111. The window 303 is displayed in the foreground. The window 302 is displayed behind the window 303. The window 301 is displayed in the background. The window 302 is displayed at the upper right of the window 303, being overlapped thereby. The window 301 is displayed at the upper right of the window 302, being overlapped thereby.

At this time, the window projecting amount of the window 303 is the largest. The window projecting amount of the window 302 is the second largest. The window projecting amount of the window 301 is the smallest.

The window 302 is displayed in the foreground after a fixed time elapses. The window 301 is displayed behind the window 302. The window 303 is displayed in the background. The window 301 is displayed at the upper right of the window 302, being overlapped thereby. The window 303 is displayed at the upper right of the window 301, being overlapped thereby.

At this time, the window projecting amount of the window 302 is the largest. The window projecting amount of the window 301 is the second largest. Then, the window projecting amount of the window 303 is the smallest.

The window 301 is displayed in the foreground after another fixed time elapses. The window 303 is displayed behind the window 301. The window 302 is displayed in the background. The window 303 is displayed at the upper right of the window 301, being overlapped thereby. The window 302 is displayed at the upper right of the window 303, being overlapped thereby.

At this time, the window projecting amount of the window 301 is the largest. The window projecting amount of the window 303 is the second largest. Further, the window projecting amount of the window 302 is the smallest.

The display returns to the initial display after still another fixed time elapses. In this manner, the window projecting amounts, the placement, and the front/back relationship of the windows 301 to 303 are changed in a fixed cycle. Thus, the visibility of videos improves.

Figure 28:
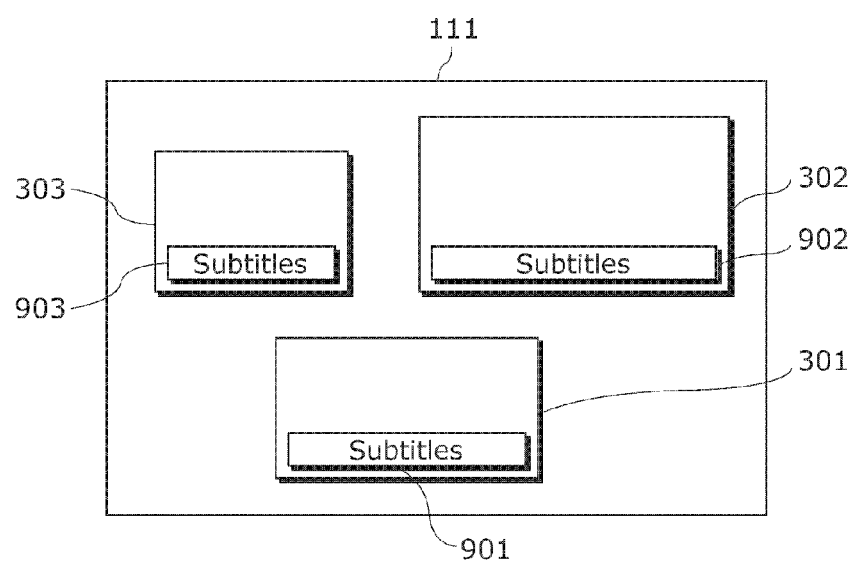
FIG. 28 illustrates an eighteenth example of display according to the embodiment.

FIG. 28 illustrates an eighteenth example of the display by the video display apparatus 100 illustrated in FIG. 6, for instance. The plural windows 301 to 303 are displayed on the screen 111 in FIG. 28. Subtitles 901 are displayed in the window 301. Subtitles 902 are displayed in the window 302. Subtitles 903 are displayed in the window 303. The subtitles 901 to 903 also appear to be projecting or receding due to parallax.

The control unit 103 determines subtitles projecting amounts of the subtitles 901, 902, and 903 to be equal to one another.

It is assumed that visibility falls if different stereoscopic effects are given to plural character strings. The control unit 103 adjusts plural subtitles projecting amounts to a fixed amount, thereby adjusting stereoscopic effects on plural character strings. Consequently, the control unit 103 prevents a decrease in visibility.

Furthermore, even if the window projecting amounts of the windows 301 to 303 are changed, the control unit 103 may control the display such that the subtitles 901 to 903 are displayed based on the same subtitles projecting amount. Alternatively, the control unit 103 may determine the subtitles projecting amounts of the subtitles 901 to 903 to be in a predetermined range.

It should be noted that although the areas for displaying the subtitles 901 to 903 appear to be projecting in FIG. 28, only the portions of characters in the subtitles 901 to 903 may appear to be projecting.

As described above, the video display apparatus 100 according to the present embodiment determines an amount of projection of each of plural windows. Plural videos are displayed in plural windows having various amounts of projection. As a result, plural videos are displayed in a wider variety of expression forms. The video display apparatus 100 combines various types of video processing, thereby further improving the appearance of the display and the visibility of plural videos.

Although the above describes a video display apparatus according to the present invention based on the embodiment, the present invention is not limited to the embodiment. The present invention also includes forms obtained by performing modification that may be conceived by those skilled in the art on the embodiment and other forms achieved by arbitrarily combining the constituent elements in the embodiment.

For example, another processing unit may execute processing executed by a specific processing unit. The order of executing processing may be changed, and plural processes may be executed in parallel.

The display by the video display apparatus is not limited to the above examples. The display by the video display apparatus may be a combination of these examples. Alternatively, only a part of any of the examples may be displayed.

The present invention is achieved not only as a video display apparatus, but also as a method in which processing means included in the video display apparatus are achieved as steps. For example, those steps are executed by a computer. In addition, the present invention can be achieved as a program for causing a computer to execute the steps included in the method. Furthermore, the present invention can be realized as a non-transitory computer-readable recording medium such as a CD-ROM on which the program is recorded.

Plural constituent elements included in the video display apparatus may be achieved as a large scale integration (LSI) which is an integrated circuit. These constituent elements may be each formed as a single chip or may be formed as a single chip to include some or all of the elements. Although an LSI is mentioned here, the integrated circuit can also be referred to as an integrated circuit (IC), a system LSI, a super LSI, or an ultra LSI, depending on the difference in the degree of integration.

Moreover, ways to achieve integration are not limited to the LSI, and a special circuit or a general purpose processor and so forth can also achieve the integration. A field programmable gate array (FPGA) that allows programming or a reconfigurable processor that allows reconfiguration of the connections and settings of circuit cells inside the LSI may also be used.

In addition, depending on the emergence of circuit integration technology that replaces LSI due to progress in semiconductor technology or other derivative technology, such technology may naturally be used to perform circuit integration of the constituent elements included in the video display apparatus.

INDUSTRIAL APPLICABILITY

The video display apparatus according to the present invention is applicable to various devices which display videos, and is useful to, for example, a television receiver, a mobile phone, a personal computer, a game machine, a home security system, and others.

REFERENCE SIGNS LIST

100 Video display apparatus
101 Receiving unit
102 Display unit
103 Control unit
104 User IF unit (user Interface unit)
105 Decoding unit
106, 108 Storage unit
107 Video processing unit
111 Screen
112 Camera
201 Left Eye
202 Right Eye
211, 212, 220 Position
230 Projecting direction (amount of projection)
301, 302, 303, 304, 305, 306, 307, 308, 309, 310, 311, 312, 313, 314, 315 Window
400 Video
500 Navigation bar
501, 502, 503, 504, 505, 506, 507, 508, 509, 510, 511, 512 Small window
600 Button
701, 702 User
801, 802 Virtual image
901, 902, 903 Subtitles

The invention claimed is:

1. A video display apparatus comprising:
   a receiving unit configured to receive plural videos;
   a display unit; and
   a control unit configured to control display of the display unit such that the plural videos are displayed on the display unit in a multi-window format in which plural windows are used for displaying the plural videos,
   wherein for each of the plural windows, the control unit is configured to determine a window projecting amount indicating an amount of projection of the window, and control the display such that one of the videos to be displayed in the window appears to be projecting or receding, due to parallax, by an amount obtained by adding the window projecting amount to a video projecting amount indicating an amount of projection of the video, and
   the control unit is configured to determine an appearance in the multi-window format, according to at least one of a category, a sound and a video projecting amount of each of the plural videos, and control the display such that the plural videos are displayed in the appearance.

2. The video display apparatus according to claim 1, wherein the control unit is configured to control the display such that in an area in which two or more of the plural windows overlap, one of the videos is displayed which is to appear in one of the two or more overlapping windows that has the largest window projecting amount.

3. The video display apparatus according to claim 1, wherein for each of the plural windows, the control unit is configured to determine whether to display, in three dimensions (3D), one of the videos to appear in the window, and control the display such that the video is displayed in 3D using parallax, when the control unit determines that the video is to be displayed in 3D.

4. The video display apparatus according to claim 1, wherein for each of the plural videos, the control unit is configured to determine the window projecting amount for the video, according to at least one of the category, the sound, and the video projecting amount of the video, and control the display such that the video appears to be projecting or receding by an amount obtained by adding the window projecting amount to the video projecting amount of the video.

5. The video display apparatus according to claim 1, wherein for each of the plural videos, the control unit is configured to determine whether to display the video in 3D, according to at least one of the category, the sound, and the video projecting amount of the video, and control the display such that the video is displayed in 3D using parallax, when the control unit determines that the video is to be displayed in 3D.

6. The video display apparatus according to claim 1, wherein for each of the plural videos, the control unit is configured to determine whether to display the video as a motion video, according to at least one of the category, the sound, and the video projecting amount of the video, and control the display such that the video is displayed as a motion video, when the control unit determines that the video is to be displayed as a motion video.

7. The video display apparatus according to claim 1, wherein the control unit is configured to determine the appearance according to categories to which the plural videos belong, and control the display such that the plural videos are displayed in the appearance.

8. The video display apparatus according to claim 7, wherein for each of the plural videos, the control unit is configured to determine the window projecting amount for the video, according to one of the categories to which the video belongs, and control the display such that the video appears to be projecting or receding by an amount obtained by adding the window projecting amount to the video projecting amount of the video.

9. The video display apparatus according to claim 7, wherein for each of the plural videos, the control unit is configured to determine whether to display the video in 3D, according to one of the categories to which the video belongs, and control the display such that the video is displayed in 3D using parallax, when the control unit determines that the video is to be displayed in 3D.

10. The video display apparatus according to claim 7, wherein for each of the plural videos, the control unit is configured to determine placement of one of the windows in which the video is to be displayed, according to one of the categories to which the video belongs, and control the display such that the video is displayed in an area where the window is placed.

11. The video display apparatus according to claim 10, wherein the control unit is configured to control the display such that, for each of the categories, one of the plural videos that has the largest video projecting amount is displayed in 3D.

12. The video display apparatus according to claim 7, further comprising a user interface unit configured to obtain an instruction from a user,
wherein the user interface unit is configured to obtain, as the instruction, at least one of (i) a setting for each of the categories as to whether to display one or more of the videos belonging to the category in 3D and (ii) a setting of, for each of the categories, the window projecting amount for one or more of the videos belonging to the category, and
the control unit is configured to determine the appearance, based on the setting, and control the display such that the plural videos are displayed in the appearance.

13. The video display apparatus according to claim 4, wherein for each of the plural videos, the control unit is configured to determine the window projecting amount for the video, according to sound included in the video, and control the display such that the video appears to be projecting or receding by an amount obtained by adding the window projecting amount to the video projecting amount of the video.

14. The video display apparatus according to claim 13, wherein when a sound volume of a first video among the plural videos is higher than a sound volume of a second video included in the plural videos and different from the first video, the control unit is configured to determine a first window projecting amount for the first video to be larger than a second window projecting amount for the second video, and control the display such that the first video appears to be projecting or receding by an amount obtained by adding the first window projecting amount to the video projecting amount of the first video.

15. The video display apparatus according to claim 1, wherein the control unit is configured to determine the appearance, according to the video projecting amounts of the plural videos, and control the display such that the plural videos are displayed in the appearance.

16. The video display apparatus according to claim 15, wherein for each of the plural videos, the control unit is configured to determine the window projecting amount for the video, according to the video projecting amount of the video, and control the display such that the video appears to be projecting or receding by an amount obtained by adding the window projecting amount to the video projecting amount of the video.

17. The video display apparatus according to claim 16, wherein when a first video projecting amount of a first video among the plural videos is larger than a second video projecting amount of a second video included in the plural videos and different from the first video, the control unit is configured to determine a first window projecting amount for the first video to be larger than a second window projecting amount for the second video, and control the display such that the first video appears to be projecting or receding by an amount obtained by adding the first window projecting amount to the first video projecting amount.

18. The video display apparatus according to claim 15, wherein for each of the plural videos, the control unit is configured to determine whether to display the video in 3D, according to the video projecting amount of the video, and control the display such that the video is displayed in 3D using parallax, when the control unit determines that the video is to be displayed in 3D.

19. The video display apparatus according to claim 18, wherein the control unit is configured to control the display such that only a video among the plural videos which has the largest video projecting amount is displayed in 3D.

20. The video display apparatus according to claim 6, wherein for each of the plural videos, the control unit is configured to determine whether to display the video as a motion video, according to whether the video is a 3D video, and control the display such that the video is displayed as a motion video, when the control unit determines that the video is to be displayed as a motion video.

21. The video display apparatus according to claim 1, wherein the control unit is configured to determine the appearance, according to a determination made for each of the plural videos as to whether the video is a motion video, and control the display such that the plural videos are displayed in the appearance.

22. The video display apparatus according to claim 21, wherein for each of the plural videos, the control unit is configured to determine whether to display the video in 3D, according to whether the video is a motion video, and control the display such that the video is displayed in 3D using parallax, when the control unit determines that the video is to be displayed in 3D.

23. The video display apparatus according to claim 1, wherein at a time when all the plural windows are refreshed, the control unit is configured to, for each of the plural videos, determine the window projecting amount for the video, and control the display such that the video appears to be projecting or receding by an amount obtained by adding the window projecting amount to the video projecting amount of the video.

24. The video display apparatus according to claim 23, wherein at the time when an entirety of the display is changed in accordance with an instruction from a user, the control unit is configured to, for each of the plural videos, determine the window projecting amount for the video, and control the display such that the video appears to be projecting or receding by an amount obtained by adding the window projecting amount to the video projecting amount of the video.

25. The video display apparatus according to claim 23, wherein at the time based on a fixed cycle, the control unit is configured to, for each of the plural videos, determine the window projecting amount for the video, and control the display such that the video appears to be projecting or receding by an amount obtained by adding the window projecting amount to the video projecting amount of the video.

26. The video display apparatus according to claim 1,
wherein the receiving unit is configured to receive a specific video, and
the control unit is configured to identify a subject included in the specific video, determine the appearance in the multi-window format, according to the identified subject, and control the display such that the plural videos are displayed in the appearance.

27. The video display apparatus according to claim 26, wherein the control unit is configured to identify whether the subject included in the specific video is a specific person, determine the appearance, according to whether the subject is the specific person, and control the display such that the plural videos are displayed in the appearance.

28. The video display apparatus according to claim 1, further comprising a user interface unit configured to obtain an instruction from a user,
wherein the control unit is configured to determine the appearance in the multi-window format in accordance with the instruction, and control the display such that the plural videos are displayed in the appearance.

29. The video display apparatus according to claim 28,
wherein the user interface unit is configured to obtain the instruction to change placement of one of the plural windows, and
the control unit is configured to determine the placement of the window in accordance with the instruction, and control the display such that one of the videos to appear in the window is displayed in an area in which the window is placed.

30. The video display apparatus according to claim 29,
wherein the user interface unit is configured to obtain the instruction to change placement of a first window among the plural windows by moving the first window, and
when the first window and a second window included in the plural windows and different from the first window overlap due to the change of the placement of the first window in accordance with the instruction, the control unit is configured to determine the appearance according to a first window projecting amount of the first window and a second window projecting amount of the second window, and control the display such that the plural videos are displayed in the appearance.

31. The video display apparatus according to claim 30, wherein the control unit is configured to control the display such that in an area where the first window and the second window overlap, one of the videos is displayed which is to appear in one of the first window and the second window that has a larger window projecting amount.

32. The video display apparatus according to claim 31, wherein the control unit is configured to control the display by resizing one of the first window and the second window to prevent a video from being covered, the video being to appear in one of the first window and the second window that has a smaller window projecting amount.

33. The video display apparatus according to claim 30, wherein when the first window projecting amount is smaller than the second window projecting amount, the control unit is configured to control the display such that one of the videos to appear in the first window is displayed in an area where the first window and the second window overlap.

34. The video display apparatus according to claim 32, wherein when the first window projecting amount and the second window projecting amount are equal, the control unit is configured to control the display to prevent the first window and the second window from being displayed overlapping.

35. The video display apparatus according to claim 34, wherein when the first window projecting amount and the second window projecting amount are different, the control unit is configured to control the display such that the first window and the second window are placed at predetermined relative positions.

36. The video display apparatus according to claim 30, wherein when the first window projecting amount and the second window projecting amount are equal, the control unit is configured to control the display such that the first window and the second window are displayed overlapping.

37. The video display apparatus according to claim 36, wherein when the first window projecting amount and the second window projecting amount are equal, the control unit is configured to control the display such that the first window and the second window are placed at predetermined relative positions.

38. The video display apparatus according to claim 28, wherein the control unit is configured to control the display such that a child window is displayed in a parent window in accordance with the instruction, the parent window being one of the plural windows, the child window being one of the plural windows and different from the parent window.

39. The video display apparatus according to claim 38, wherein the control unit is configured to determine a child window projecting amount of the child window to be larger than a parent window projecting amount of the parent window, and control the display such that one of the videos to be displayed in the child window, appears to be projecting or receding by an amount obtained by adding the child window projecting amount to the video projecting amount of the video.

40. The video display apparatus according to claim 29, wherein the control unit is configured to determine the placement of the one of the plural windows in accordance with the instruction, determine whether to display, in 3D, the video to appear in the window, according to the placement of the window, and control the display such that the video is displayed in 3D in an area based on the placement of the window, when the control unit determines that the video is to be displayed in 3D.

41. The video display apparatus according to claim 40, wherein the control unit is configured to determine to display, in 3D, the video which is to appear in the window, when the window is included in a specific area, and control the display such that the video is displayed in 3D.

42. The video display apparatus according to claim 41, wherein the control unit is configured to determine the placement of the window such that the window is not placed over a boundary of the specific area, and control the display such that the video is displayed in an area based on the placement of the window.

43. The video display apparatus according to claim 29, wherein the control unit is configured to determine the placement of the window in accordance with the instruction, determine the window projecting amount of the window, according to the placement of the window, and control the display such that the video to be displayed in the window appears to be projecting or receding by an amount obtained by adding the window projecting amount to the video projecting amount of the video.

44. The video display apparatus according to claim 28, wherein the user interface unit is configured to obtain, as the instruction, a setting of the window projecting amount of one of the plural windows which is limited to a range where the window projecting amount is settable, the range being predetermined according to an area in which the window is placed, and
the control unit is configured to control the display such that one of the videos to be displayed in the window appears to be projecting or receding in the area based on the placement of the window, by an amount obtained by adding the window projecting amount based on the setting to the video projecting amount of the video.

45. The video display apparatus according to claim 28, wherein the user interface unit is configured to obtain the instruction to remove a predetermined one of the windows, and
the control unit is configured to remove the predetermined window in accordance with the instruction, and control the display such that the window projecting amount of a window behind the predetermined window is larger than the window projecting amount of the window prior to the removal of the predetermined window.

46. The video display apparatus according to claim 28, wherein the user interface unit is configured to obtain the instruction to remove a predetermined one of the windows, and
the control unit is configured to remove the predetermined window in accordance with the instruction, and control the display such that the window projecting amount of a window in front of the predetermined window is smaller than the window projecting amount of the window prior to the removal of the predetermined window.

47. The video display apparatus according to claim 45, wherein the control unit is configured to control the display by removing the predetermined window at a time when an event is generated for the predetermined window in response to the instruction.

48. The video display apparatus according to claim 28, wherein the user interface unit is configured to obtain the instruction to transfer information in relation to a first window in foreground among the plural windows to another device different from the video display apparatus, and
the control unit is configured to remove the first window in response to the instruction, and control the display such that the window projecting amount of a second window behind the first window is larger than the window projecting amount of the second window prior to the removal of the first window.

49. The video display apparatus according to claim 1, wherein the control unit is configured to determine an appearance in the multi-window format, according to a load on the video display apparatus, and control the display such that the plural videos are displayed in the appearance.

50. The video display apparatus according to claim 49, wherein the control unit is configured to calculate the load, based on sizes of the plural windows, a total number of the plural windows, or sizes of the plural videos, determine the appearance according to the load, and control the display such that the plural videos are displayed in the appearance.

51. The video display apparatus according to claim 49, wherein the control unit is configured to calculate the load, based on a total number of windows each for displaying a video in 3D among the plural windows, determine the appearance according to the load, and control the display such that the plural videos are displayed in the appearance.

52. The video display apparatus according to claim 49, wherein the control unit is configured to control the display by limiting a total number of the plural windows when the load is greater than a predetermined threshold value.

53. The video display apparatus according to claim 49, wherein the control unit is configured to control the display by limiting sizes of the plural windows when the load is greater than a predetermined threshold value.

54. The video display apparatus according to claim 49, wherein the control unit is configured to control the display such that, among the plural videos, a motion video is displayed as a still image, when the load is greater than a predetermined threshold value.

55. The video display apparatus according to claim 49, wherein the control unit is configured to control the display such that, among the plural videos, a 3D video is displayed in 2D, when the load is greater than a predetermined threshold value.

56. The video display apparatus according to claim 49, wherein the control unit is configured to control the display such that error concealment control is executed, when the load is smaller than or equal to a predetermined threshold value.

57. The video display apparatus according to claim 1, wherein the control unit is configured to control the display such that, among the plural windows, only a window in foreground is displayed in an appearance different from an appearance for a window different from the window in the foreground.

58. The video display apparatus according to claim 57, wherein the control unit is configured to control the display such that the window in the foreground appears to be larger than the different window.

59. The video display apparatus according to claim 57, wherein the control unit is configured to control the display such that only a video to appear in the window in the foreground is displayed in 3D among the plural videos.

60. The video display apparatus according to claim 57, wherein the control unit is configured to determine the window projecting amounts of the plural windows such that only the window in the foreground has a larger window projecting amount than the window projecting amount of the different window, and control the display such that one of the videos to be displayed in the window in the foreground appears to be projecting or receding by an amount obtained by adding the window projecting amount of the window in the foreground to the video projecting amount of the video.

61. The video display apparatus according to claim 1, wherein the control unit is configured to determine plural subtitles projecting amounts of subtitles which are to be displayed in the plural windows to be equal in the plural windows, and control the display such that the subtitles are displayed according to the equal subtitles projecting amounts, the plural subtitles projecting amounts indicating amounts of projection of the subtitles.

62. The video display apparatus according to claim 61, further comprising a user interface unit configured to obtain an instruction from a user,
wherein the user interface unit is configured to obtain a setting of the window projecting amount of one of the plural windows as the instruction, and
the control unit is configured to determine the plural subtitles projecting amounts such that the plural subtitles projecting amounts are equal even when the user interface unit obtains the setting, and control the display such that the subtitles are displayed according to the equal subtitles projecting amounts.

63. The video display apparatus according to claim 1, wherein the control unit is configured to determine plural subtitles projecting amounts of subtitles which are to be displayed in the plural windows to be in a predetermined range, and control the display such that the subtitles are displayed according to the plural subtitles projecting amounts in the predetermined range, the plural subtitles projecting amounts indicating amounts of projection of the subtitles.

64. The video display apparatus according to claim 1, wherein the control unit is configured to determine the window projecting amounts of the plural windows by adjusting the window projecting amounts to have different values, and control the display such that the plural videos are displayed according to the window projecting amounts.

65. The video display apparatus according to claim 64, wherein the control unit is configured to determine the window projecting amounts to be in a predetermined range, and control the display such that the plural videos are displayed according to the window projecting amounts.

* * * * *